United States Patent
Richardson et al.

(10) Patent No.: US 12,542,807 B2
(45) Date of Patent: Feb. 3, 2026

(54) DETECTING CYBER THREATS USING ARTIFICIAL INTELLIGENCE

(71) Applicant: Nvidia Corporation, Santa Clara, CA (US)

(72) Inventors: Bartley Douglas Richardson, Alexandria, VA (US); Shawn Davis, Burke, VA (US); Gorkem Batmaz, Cambridge (GB); Rachel Allen, Arlington, VA (US)

(73) Assignee: Nvidia Corporation, Santa Clara, CA (US)

( * ) Notice: Subject to any disclaimer, the term of this patent is extended or adjusted under 35 U.S.C. 154(b) by 191 days.

(21) Appl. No.: 18/185,578

(22) Filed: Mar. 17, 2023

(65) Prior Publication Data

US 2024/0314164 A1   Sep. 19, 2024

(51) Int. Cl.
*H04L 9/40*   (2022.01)

(52) U.S. Cl.
CPC ............... *H04L 63/1483* (2013.01)

(58) Field of Classification Search
CPC . H04L 63/1483; H04L 63/1491; G06N 20/00; G06N 3/092; G06F 21/56
See application file for complete search history.

(56) References Cited

U.S. PATENT DOCUMENTS

| | | | | |
|---|---|---|---|---|
| 2017/0222960 A1* | 8/2017 | Agarwal | ............... | G06Q 10/107 |
| 2018/0041537 A1* | 2/2018 | Bloxham | ............ | H04L 63/0263 |
| 2019/0005428 A1* | 1/2019 | Kras | ................ | G06Q 10/06314 |
| 2019/0173915 A1* | 6/2019 | Irimie | ................. | H04L 63/1425 |
| 2019/0215329 A1* | 7/2019 | Levy | ....................... | G06N 20/00 |
| 2020/0036750 A1* | 1/2020 | Bahnsen | ............. | H04L 63/1416 |
| 2020/0204572 A1* | 6/2020 | Jeyakumar | ............ | G06F 21/561 |
| 2020/0366712 A1* | 11/2020 | Onut | ................... | H04L 63/1416 |

(Continued)

OTHER PUBLICATIONS

S. Palka and D. McCoy, "Dynamic phishing content using generative grammars," 2015 IEEE Eighth International Conference on Software Testing, Verification and Validation Workshops (ICSTW), Graz, Austria, 2015, pp. 1-8, doi: 10.1109/ICSTW.2015.7107458 (Year: 2015).*

(Continued)

*Primary Examiner* — Michael Simitoski
(74) *Attorney, Agent, or Firm* — Hogan Lovells US LLP

(57) ABSTRACT

Approaches in accordance with various illustrative embodiments provide for the generation of synthetic communications for use in training and fine-tuning threat detection models for various categories of recipients. In at least one embodiment, guidelines can be determined for a category of recipient that can be used to generate multiple types of content using generative artificial intelligence (AI), as may include text, image, and file content. A training communication can be generated using these types of content, such as to generate an email message that corresponds to a potential spear phishing attack. The generated messages can be checked for quality, and any messages that are caught by existing filters can be deleted or regenerated so that only high quality examples of spear phishing are provided as output. These training communications can be used to train a spear phishing detector for a specific category of recipient, in order to accurately flag and prevent access to actual spear phishing communications.

20 Claims, 25 Drawing Sheets

(56) References Cited

U.S. PATENT DOCUMENTS

| | | | | |
|---|---|---|---|---|
| 2021/0075828 | A1* | 3/2021 | Kras | H04L 51/42 |
| 2021/0152597 | A1* | 5/2021 | Sites | G06F 21/577 |
| 2021/0194924 | A1* | 6/2021 | Heinemeyer | G06N 5/04 |
| 2021/0390181 | A1* | 12/2021 | McClay | G06N 20/00 |
| 2022/0094702 | A1* | 3/2022 | Saad Ahmed | H04L 63/1416 |
| 2022/0210188 | A1* | 6/2022 | Grewal | H04L 63/1483 |
| 2022/0345485 | A1* | 10/2022 | Kras | H04L 51/212 |
| 2022/0377101 | A1* | 11/2022 | Kras | H04L 63/1483 |
| 2022/0400094 | A1* | 12/2022 | Sampath | G06F 40/284 |
| 2023/0007042 | A1* | 1/2023 | Haworth | H04L 63/205 |
| 2023/0039382 | A1* | 2/2023 | Xu | G06F 21/554 |
| 2023/0075964 | A1* | 3/2023 | Singh | G06N 3/045 |
| 2023/0224325 | A1* | 7/2023 | Mautone | H04L 63/1466 726/22 |
| 2023/0336588 | A1* | 10/2023 | Adams | G06F 40/20 |

OTHER PUBLICATIONS

Das, Avisha. "Proactive Defense through Automated Attack Generation: a Multi-pronged Study of Generated Deceptive Content". Diss. 2020. (Year: 2020).*

R. Al-Qurashi, A. AlEroud, A. A. Saifan, M. Alsmadi and I. Alsmadi, "Generating Optimal Attack Paths in Generative Adversarial Phishing," 2021 IEEE International Conference on Intelligence and Security Informatics (ISI), San Antonio, TX, USA, 2021, pp. 1-6. (Year: 2021).*

P. Robic-Butez and T. Y. Win, "Detection of Phishing websites using Generative Adversarial Network, " 2019 IEEE International Conference on Big Data (Big Data), Los Angeles, CA, USA, 2019, pp. 3216-3221, doi: 10.1109/BigData47090.2019.9006352. (Year: 2019).*

* cited by examiner

DETECTING CYBER THREATS USING ARTIFICIAL INTELLIGENCE

BACKGROUND

Spear phishing is one of the largest and costliest forms of cyber threats, resulting in billions of dollars in costs to businesses and individuals each year. While there are many approaches that can successfully detect basic phishing attacks, these solutions are not sufficiently fine-tuned to accurately detect attacks that are more specifically tailored to specific individuals or types of users, such as spear phishing and whale phishing attacks where significantly more effort is put in to crafting communications that target specific individuals of high worth or importance. As an example, a phishing email might be directed to the CEO of a company and be carefully crafted in such a way as to appear to be a legitimate email message from someone with whom the CEO may have previously interacted, involving subject matter that is relevant to the CEO within that context. Approaches for generating these targeted messages on a large scale are becoming increasingly accurate at generating realistic-looking messages, particularly when leveraging technologies such as generative artificial intelligence (AI), which makes these messages both more difficult and more critical to detect.

BRIEF DESCRIPTION OF THE DRAWINGS

Various embodiments in accordance with the present disclosure will be described with reference to the drawings, in which.

DETAILED DESCRIPTION

Figure 1A:
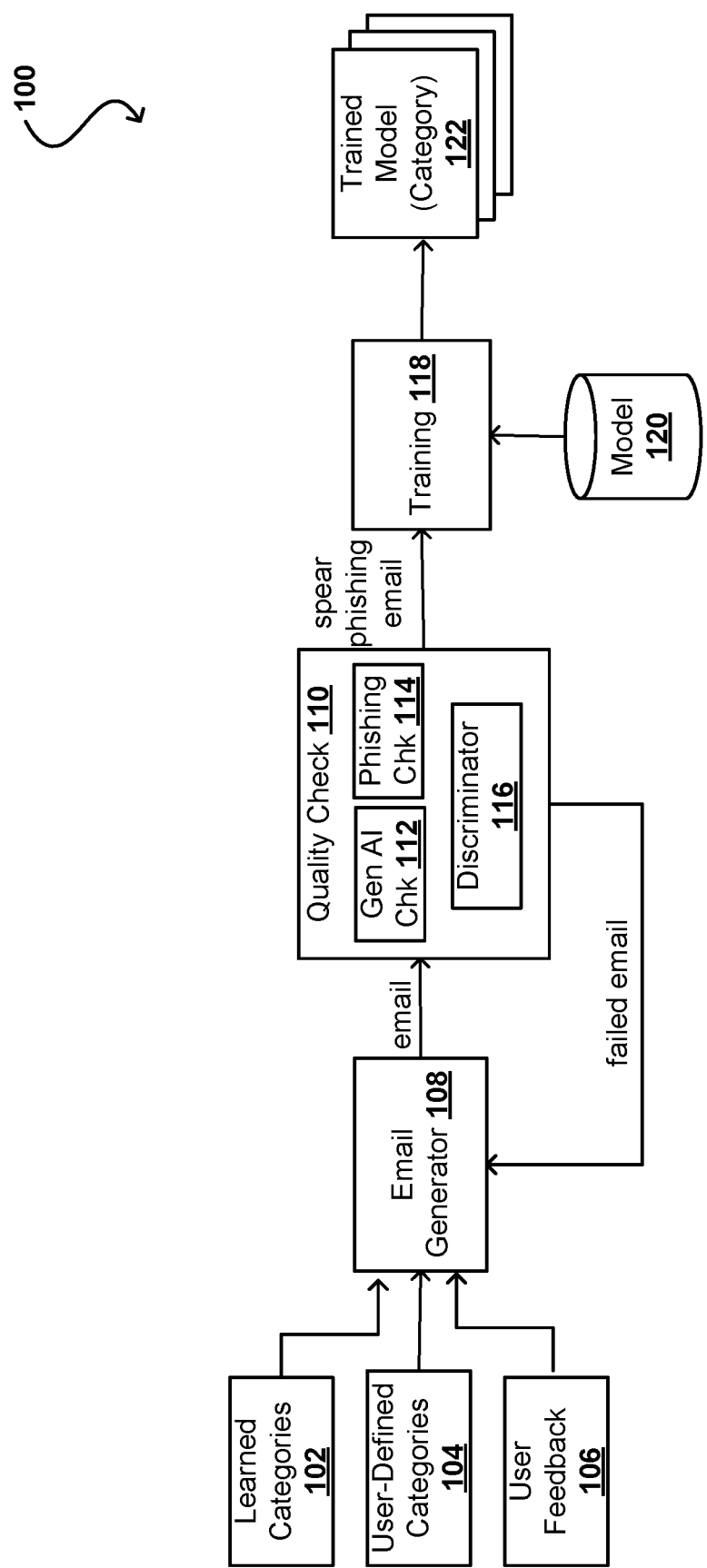
FIGS. 1A and 1B illustrate components of an example system to generate training data and train one or more threat detection models in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various illustrative embodiments provide for the generation of training data to be used to train one or more threat detectors. In particular, example spear phishing email messages can be generated using multiple types of generated content that can be used to train and fine-tune a set of detection models for different categories of recipients.

In accordance with at least one embodiment, a large amount of well-crafted training data can be generated that can be used to detect potential cyberthreats, such as spear phishing or "whale phishing" messages that are targeted to specific individuals or types of individuals. In particular, one or more detection models can be trained to accurately identify spear phishing email messages for specific categories of recipients. Multiple models can leverage generative artificial intelligence (AI) to multiple types (or modalities) of content to be included in these training communications, such as may include various AI generators to generate or synthesize text (including hyperlinks), images, and file attachments. Content from these various modalities can be combined (or otherwise used) to form sample spear phishing communications, which can then be passed through one or more filters (to check for standard phishing content or AI-generated content) to determine whether the communication can be viewed as a good example of a spear phishing email. If a message is filtered out and determined not to be a good example, information for that message can be used to generate a new message that should serve as a better example. The good example training messages can then be used to train and/or fine tune a respective threat detector for a respective category. Once trained, a spear phishing detection model can analyze content for these various modalities in a received communication and determine whether the communication is likely safe or unsafe (e.g., is likely a spear phishing communication), or can flag the communication as suspicious. A suspicious communication can be provided to the recipient with information flagging the message as suspicious or potentially risky, for example, and may provide relatively specific information as to why the message was flagged as suspicious. Different models can be trained and/or fine-tuned for different roles or types of recipients. Actions or feedback taken by a recipient with respect to a suspicious communication can be used to further fine-tune the relevant model(s).

Variations of this and other such functionality can be used as well within the scope of the various embodiments as would be apparent to one of ordinary skill in the art in light of the teachings and suggestions contained herein.

Figure 1B:
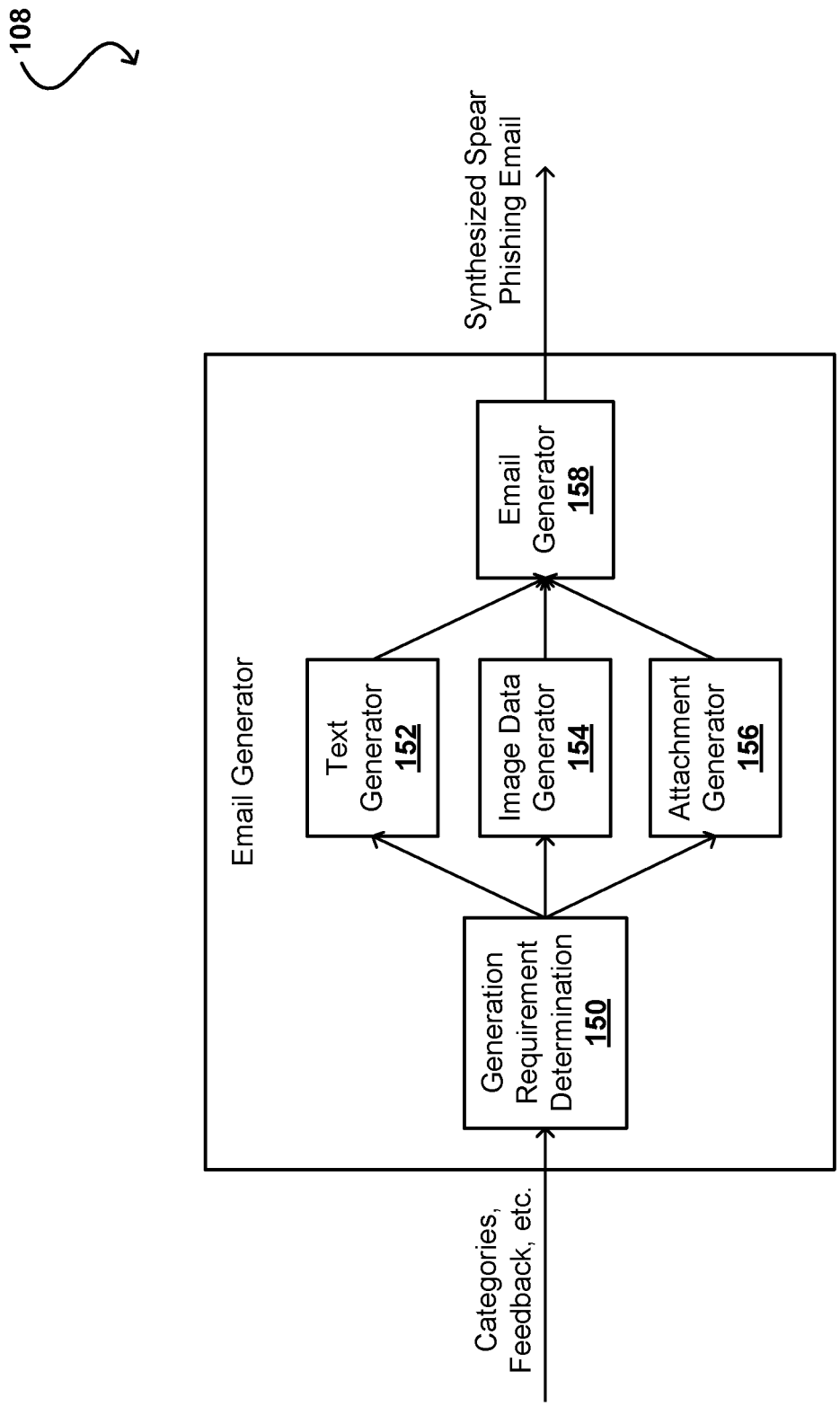

FIGS. 1A and 1B illustrate components of an example system 100 for training a cyber threat detector that can be used in accordance with at least one embodiment. In particular, FIG. 1A illustrates a system that can be used to train a machine learning-based detector to detect targeted phishing attempts, as may relate to spear phishing or whale phishing, such as may be attempted using email messages that are specifically crafted to target specific individuals or types of individuals. Certain existing approaches to detecting cyber-attacks attempt to train a detector to detect these attempts, but while these detectors may perform reasonably well with respect to regular phishing email messages, which are high-volume, low click through messages that are typically generic in form to attempt to capture a wide audience, these detectors do not perform as well when it comes to targeted email messages due, in large part, to the lack of available training data due to the relatively small number of these messages that are sent to a small number of high-level and/or high-profile individuals (such as may have roles of CFO, CTO, CISO, or SVP). These targeted "spear phishing" email messages are more carefully constructed than their generic phishing counterparts, and therefore can also be more difficult to detect using a generic detector. Further, since these emails can be generated and trained within a short time with minimal hardware resources in at least one embodiment, such an approach can scale to individual users who are not necessarily at what might be considered high-level or high-visibility roles, but often provide critical services and are charged with protecting individuals and systems. An example relates to employees in the financial services sector, who could be explicitly targeted in order to compromise critical banking infrastructure or private customer information.

The example system 100 illustrated in FIG. 1A can synthesize training data for use in training a detector to detect spear phishing email messages, or other such communications that may pose a threat in a computing environment. Because these types of cyber-attacks are typically crafted differently for different categories of users, there may be individual detection models that are specifically trained or fine-tuned for at least some of these categories. These categories (or other types of groupings) may be determined using a number of different approaches. One approach can be a machine-learning based approach that learns ways to categorize users based in part on the similarities of the types of communications that those users send, receive, view, create, or otherwise engage. These categories can be learned based on other types of upstream behavioral analysis as well. The learned categories 102 may be human explainable, such as may relate to human resources or chief executive officers (CEOs), or may not be human explainable, such as those people who receive communications with specific similar characteristics or features. There may also be user-defined categories, which may relate to specific groups of users such as finance personnel or c-suite individuals, but may also vary by company or enterprise based on potential targets of spear phishing, such as may relate to a head of recruiting or a finance manager, among other such options. User-defined categories 104 may be determined by a human expert, for example, and selected at any appropriate granularity based on any appropriate similarities or features, as long as the users or recipients in those categories are likely to receive cyber threat communications that are at least somewhat similar in nature, format, or content.

Information for a given category for which one or more training communications is to be generated can be input to an email generator 108, or other communication generator. As is discussed in greater detail later herein, there may also be user feedback that was provided in response to one or more prior messages of that type, such as whether an email message was determined by a user to have been properly classified as a risk or non-risk, for example, and this feedback can be provided as input to the email generator 108 to help to improve the quality of the generated email messages with respect to their appearance as legitimate spear phishing email messages. Although described for an individual message, it should be understood that there can be multiple training communications generated in parallel using one or more generators for one or more of these categories in various embodiments.

A training communication corresponding to a synthesized spear phishing email can be processed using at least one quality check module 110, system, process, or service. The training communication may be processed using one or more filters or checks 112, 114, such as to determine or predict whether the training communication appears to be a phishing email or is determined to likely have been generated using generative AI, among other such options. In at least some embodiments, each filter or check can generate a score for a respective probability or confidence in determination. These scores can be fed to a discriminator 116, which may take various forms, such as a trained neural network or an algorithm that applies a threshold, among other such options. The discriminator 116 can take these scores, as well as other potential information such as the email message itself in some embodiments, and can make a determination as to whether the email should be excluded as not properly representing a spear phishing email message, at least according to the checks or filters that were performed or applied. In some embodiments, a determination that a message was generating using generative AI may not alone cause the message to be filtered out or not filtered out, as there may be legitimate email messages generated using generative AI which spear phishing email messages may attempt to replicate. The determination of likely generation by generative AI may, however, increase the likelihood of a message being determined to not be a good example of a spear phishing email when combined with scores from other checks or filters. In some embodiments, a generative AI check module 112 or process might not check to determine whether a message appears to have been generated using generative AI in general, but whether it demonstrates a poorly formed message that exhibits artifacts or deficiencies commonly produced by generative AI, which would not likely be convincing to a recipient that the message is a legitimate message. If the email message is determined to not be a good example of a spear phishing attempt, then information for that failed training email can be fed back into the email generator 108 to attempt to further train or fine-tune the generator, or to trigger the email generator to generate a variation of that message to attempt to generate a better training communication example.

Synthetic training communications that are generated by the email generator 108 and pass through the quality check module 110 as representing spear phishing communications can the provided as input to a training module 118. The training module can select a model from a model repository 120, as may correspond to an untrained neural network or a pre-trained neural network in at least some embodiments, where a pre-trained network might be pre-trained to detect phishing messages or generic spear phishing messages, and can then be fine-tuned for specific categories of recipients. The training module 118 can perform fine tuning of different models, or different instances of the same base model, for at least some of the input categories, if not each of the input categories. Once the category-specific models are sufficiently trained, such as where an end criterion is satisfied, those models can be provided as trained, category-specific models 122 that can be used to perform inferencing on actual received communications. The training end criterion can be any appropriate end criterion, such as a network being determined to converge, all training data being processed, or a maximum number of training iterations performed, among other such options.

FIG. 1B illustrates example components that can make up a communication generator, such as the email generator 108 illustrated in FIG. 1A. Such a generator can be used to generate email messages in a sequence, or may generate several messages in parallel and at scale, among other such options. In this example, an email generator 108 can receive input such as that discussed with respect to FIG. 1A, such as may relate to one or more categories for which to generate communications, user feedback relating to accuracy of one or more communications for a one or more categories, and other such information. Additional input may be provided as well that may help to generate realistic-looking communications. For example, in at least one embodiment this may include publicly-available information for potentially targeted recipients (or senders), as may include social media accounts, bios, or posts, as well as one or more other forms of external threat intelligence, as may relate to reputation scores of senders, etc. Categories may be provided one at a time to quickly generate training data for a single category, or multiple categories can be provided for concurrent generation.

In this example, the input is directed to a generation requirement determination module 150, for example, which can determine any requirements or guidelines to be used for generating communications for a given category. This may include, for example, types of content to include or not include, as well as combinations of different types of content to include or not include, formats to be used, and the like. Once determined, an input category and determined requirement or guideline information can be presented to a set of generators 152, 154, 156. The generators used may depend in part upon the type of communication to be generated and any guidelines or requirements determined for a specific category. In this example, for spear phishing message generation the generators include a text generator 152, an image data generator 154, and an attachment or file generator 156. These may be the same types of generators or different types of generators, such a transformer model (e.g., Megatron-LM-GPT2) that may leverage a generative AI model (e.g., an autoregressive transformer model) for generating textual content, including body content and embedded hyperlinks, for example, as part of the text generator, and a generative adversarial network (GAN) for generating an image as part of the image data generator 154, among other such options. A text generator 152 can generate text for different portions of a communication, such as a subject line, body text, and other portions, that include content determined to be relevant to the respective category. Any appropriate generative AI for text can be used, as may include a GPT-2 or GPT-3 model built using a NeMo AI framework from NVIDIA Corporation, among other such options such as ChatGPT, Replika, Chinchilla, BardAI, ChatSonic, DialoGPT, Bing AI, or OpenAI Playground, among other such options. An image data generator 154, such as might be a diffusion model or generative model (e.g., a GAN), might generate a realistic image, an image that is not necessarily realistic but appears to a computer as a valid image, or simply image metadata specifying information about the image (e.g., a size or resolution) that can be analyzed by a detector. Similarly, an attachment generator 156 can generate an actual file, a file that may not make sense to a human but that appears to a computer as a valid file, or simply metadata specifying information about the file. If necessary, an attachment generator can generate an image that can then be converted into an attachment of a specific format if a generator is not available or trained for that format. Metadata about an image or file may be sufficient, as it can be undesirable in many instances for a detector to open and analyze an image or file attachment, not only because such opening can greatly increase the processing time and need for processing resources, but also because opening such a file may expose the system to a virus, malware, or other such undesirable content. Similarly, any hyperlink generated by the text generator may not necessarily point to an actual destination, or destination with actual content, but may simply appear as a properly formatted hyperlink, as it will be undesirable in many instances for a detector to follow a hyperlink during processing due to similar risks.

The content from these various generators can then be provided to an email generator 158, or other module, component, service, or process for using at least some of this generated content to generate a training communication, such as a training email that emulates an email associated with a spear phishing attack. In this example, the email generator may include an application, algorithm, or AI model for combining at least some of the generated content to create a realistic but synthetic communication that emulates the type of attack for which the model is to be trained, which in many instances will be specific to, or customized for, the corresponding category of recipient. In some embodiments, there may be different generators for different types of communications, or for different categories of recipients for the same type of communication. In some embodiment, a single generator may be able to be used if that generator is able to generate content for the various modalities to be used, as may relate to email, image, and file content, among other such options.

Figure 2:
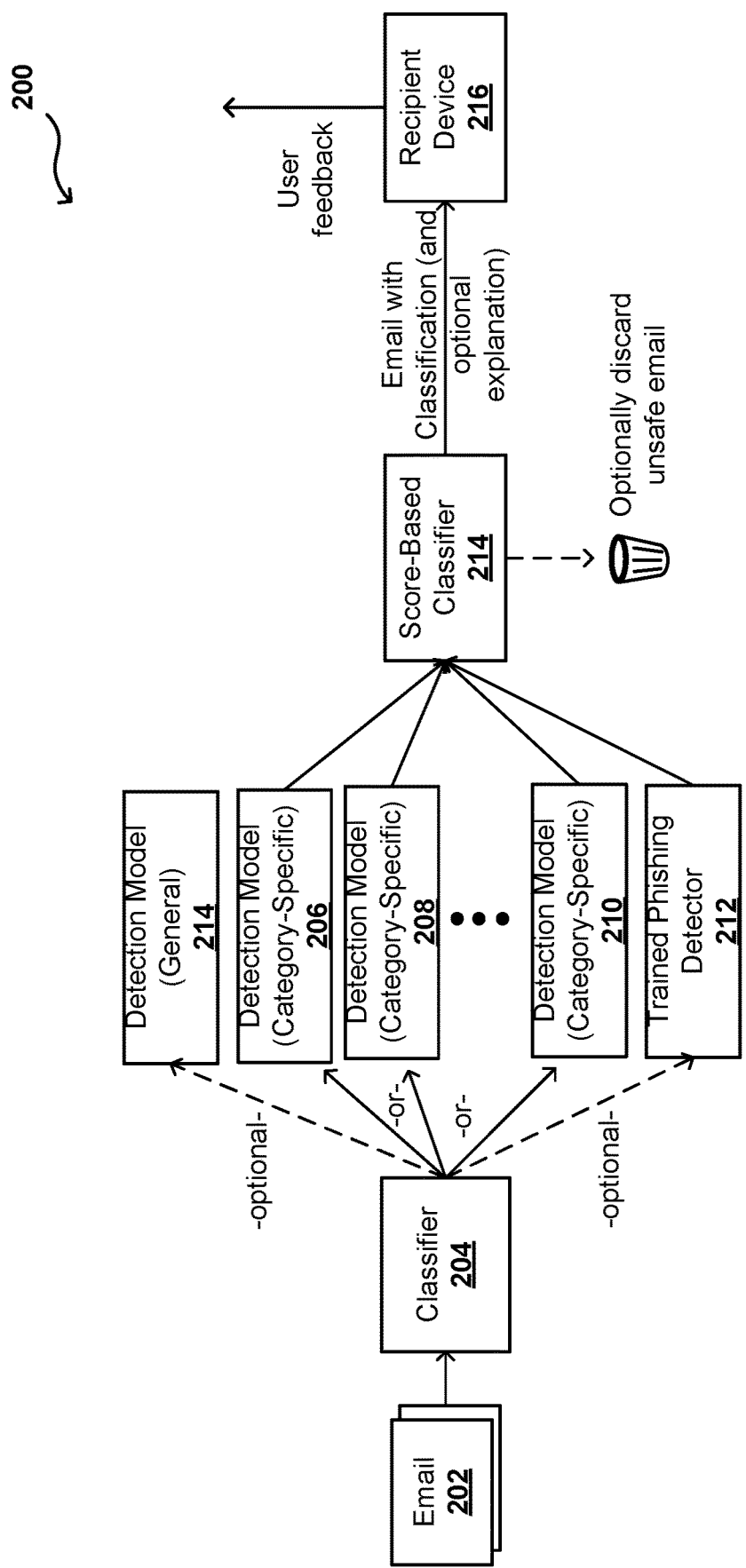
FIG. 2 illustrates an example system for processing received communications using one or more trained threat detection models, which can be used in accordance with various embodiments.

Once trained, the category-specific detectors can be used to process actual received communications, or other such data or content, using a system 200 such as that illustrated in FIG. 2. In this examples, a number of email messages 202 are received from external sources, such as those that may be sent from across a public network or outside a secure enterprise boundary or firewall, among other such options. Other communications, data, or content in other forms can be received as well, as may come from other sources within a trusted environment as well, in at least some embodiments. In this example, these email messages 204 are provided to a trained classifier 204 that can attempt to determine at least one category to which the email likely belongs. In some embodiments, other processing or pre-processing may be performed as well, such as to apply one or more spam filters, virus scanners, address blockers, and the like. The classifier can analyze a received email message and determine a most likely category in one embodiment, where the possible categories can be those discussed with respect to FIG. 1 that were used to train individual detection models, but may also include other categories that may not have trained detection models as well. In some embodiments, the classifier might generate a probability score for each of a set of possible categories, and select the category or categories that have at least a minimum or threshold probability to apply to an email message. In some embodiments, and email message might be relevant to multiple categories, such as when a message is sent to a CTO and also relates to technology licenses or invoices, so might apply to a CTO or c-suite category as well as an accounting or legal category, etc. Further, there may be some messages that are not clearly a single category, but where the probability of the message belonging to two more categories satisfies a minimum threshold. If a given message does not have a determined confidence or probability value (or other such metric) that at least satisfies a threshold level for any given category, then that message may not be processed by any given category-specific model, might be processed by a category-specific model with a highest probability or confidence value, might be processed by all category-specific models, or might be processed by an optional general detection model 214 that is not specific to any given category. In some embodiments, each message may be processed by a general detection model 214 even if the message is also determined to belong to at least one category. In some embodiments, a given message may also be processed using an optional phishing detector 212 or other such detector, in order to avoid allowing through messages that may not be classified as a spear phishing email but might still be identified by a regular phishing detector 212. Various other detectors can be applied as well in various embodiments.

In this example, each model (or algorithm, etc.) that processes an email message can provide a score, such as a probability or confidence on a scale of 0 to 100, or 0 to 1, that the email is an unsafe email (such as corresponds to a phishing or spear phishing email) or is a safe email that does not correspond to a phishing or spearphishing email, or other type of detected threat or cyber-attack. In at least one embodiment, any or all generated scores for a given email can be provided as input to a score-based classifier 214. A score-based classifier can take any of a number of forms, such as an algorithm, process, or trained machine learning model, which can take these scores and classify the email into one of a number of potential classifications. In at least one embodiment, an approach can be used that is based upon summarization and classification, for example, while other embodiments might use zero-shot inference results or tabular data analysis, among other such options. In at least one embodiment there can be a safe threshold and an unsafe threshold used to determine classifications based, at least in part, upon one or more inferred threat scores. A classifier might perform a weighted average of the scores from the various detection models to generate an overall threat score for an email message. If the overall threat score is at or above an unsafe threshold then the email can be classified as unsafe (or a similar threat classification). If the overall threat score is at or below a safe threshold then the email can be classified as safe (or a similar non-threat classification). If the overall threat score is between these two thresholds, then the email can be classified as unsure (or potentially unsafe, etc.). In other embodiments, a trained classification network might output a classification with a determined confidence, among other such options. However, the detection methodology outlined above is but one example. Once the models are trained, they can be run inside or alongside existing infrastructure and with existing security automation tooling.

For an email that is classified to be safe, that message can be delivered to an address or location where that message can be retrieved or accessed by a recipient device 216, as one might access a typical communication. If the message is classified as unsafe, or a threat, etc., then that message might be discarded without delivery in order to ensure that the recipient does not accidentally or unintentionally expose the system to the threat. In other embodiments, the unsafe message (or a version of the unsafe message) might be delivered, but with information indicating that the message is unsafe and should not be trusted. In at least one embodiment, any links or attachments might be blocked, removed, or disabled from an unsafe message so that a recipient can view at least the textual content of the message without being exposed to the potential threat. An unsafe message might be delivered to a recipient so that the recipient can have the ability to determine whether the classification as unsafe may have been incorrect, and flag the message for review by security personnel for potential reclassification and delivery. Any change in classification can be provided as feedback that can be used to fine-tune the relevant model(s). Similarly, if an email message is unable to be classified as safe or unsafe, and is either unclassified or classified in an unsure classification, for example, then that message might be delivered but with additional information indicating that the message has been determined to be suspicious or may correspond to a threat, so that a recipient can determine what to do with the message. This may include, for example, treating the email message as a normal message if the recipient believes it to be safe, deleting the message if the recipient believes it to be unsafe, or submitting for review if the recipient is also not sure. Information can be provided to the recipient to help the recipient understand why the message was determined to be suspicious, which can help the recipient make a more informed determination. For any of these options, the recipient might provide specific feedback that can be used to fine-tune the relevant model(s), or the action(s) taken with respect to the email message can be monitored as used as feedback to fine-tune the model, such as whether the recipient opens and follows the links or opens the attachments successfully, or whether the recipient deletes without opening or reports, among other such options.

Figure 3:
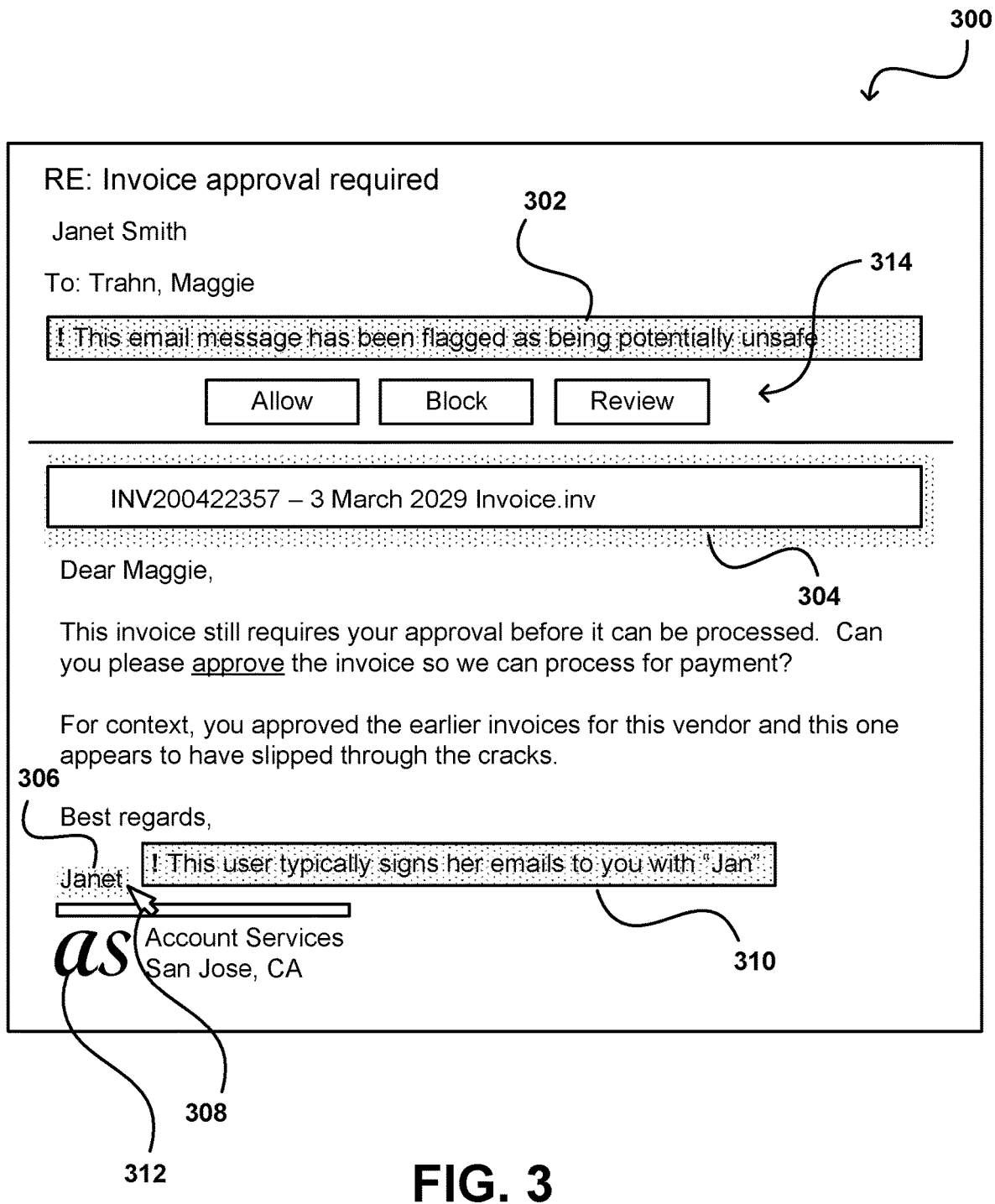
FIG. 3 illustrates an example email message that has been modified to indicate a potential threat and include information indicating why the message was determined to correspond to a potential threat, which can be generated in accordance with various embodiments.

FIG. 3 illustrates an example email message 300 that can be displayed to a recipient or viewer in accordance with at least one embodiment. In this example, the message has been classified with an "unsure" or "suspicious" classification and has been delivered to the recipient, but with additional information that can help the recipient determine what to best do with respect to the message. In this example, a warning 302 is positioned prominently in the message to indicate that the message may not be a legitimate message or may otherwise pose some type of threat. There may also be information provided with the email message indicating why it was identified as a potential threat. Here, there is highlighting performed around aspects that led to the determination, including a first highlight area 304 around an attachment, and a second highlight area 306 around a signature. In this example, a recipient or viewer can perform an action, such as to move a mouse cursor 308 to hover over the highlight region 306 to obtain additional information. In this example, the additional information 310 can appear to indicate that the alleged sender typically signs with the name "Jan" rather than her full name Janet. If the user were to hover the cursor over the first highlight region 304, the interface might present information indicating that the invoice is not in the proper format or is not of the appropriate size for an invoice attachment, based upon metadata associated with the attachment. An image 312 in the email message did not lead to the determination of potential risk, and thus does not correspond to a highlighted region in this example. Other approaches to providing such information, such as into insert body text or image icons, can be used as well within the scope of various embodiments. An advantage to approaches presented herein is that threat determinations are not only able to be made based on specific modalities, but also the combinations of these various modalities, which is not possible with various existing systems. A size of an attachment or a word used in a body of text may not be enough alone to classify a received communication as a threat, but the combination of at least those two things may be sufficient to classify the communication as a threat.

As mentioned, approaches in accordance with various embodiments can monitor what an authenticated recipient does with this message, and use that to provide feedback. There may also be specific feedback options or elements 314 presented that can be used to provide feedback. In some embodiments these may be optional if the user wants to provide feedback, while in other embodiments a selection of one of these options must be taken in order to process the email message. For example, hyperlinks may be blocked or attachments prevented from being opened unless a user selects an "allow" option, which then also provides feedback that the recipient viewed this as a safe email message. A user might have to select a "block" or similar option to not only delete the message, but also cause any appropriate security measures to be taken with respect to an email message the recipient determines to be unsafe. Another option, such as a "review" or "report" option might cause the message to remain in the inbox in a partially disabled state while a security team reviews the message, and makes a determination on behalf of the recipient, at which point the message can be allowed or deleted. This option can also provide feedback to be used to fine tune the relevant model(s). Other actions can be taken based on this feedback as well, such as to blacklist or whitelist certain recipients or types of messages, etc.

Use of such an adversarial loopback for fine-tuning can help to enhance the quality of the communications synthesized using generative AI for various modalities, allowing for the construction of millions of realistic, highly-targeted spear phishing emails, or other communications or types of content, that are aimed at pre-determined buckets of individuals, as may be grouped by aspects such as job function, title, or role). Such synthesized communications can help to address a general lack of available data to train downstream threat detectors, as may relate to spear phishing or other types of attacks. The trained detectors can then be deployed in existing (or newly created) inference pipelines without need for any or significant modification to the pipelines. In at least some embodiments, enterprises can be provided with the ability to fine-tune these pre-trained models to their individual needs.

An advantage to using generative AI to generate such training data as well is that the messages generated do not need to be full messages, and in many cases are not full messages, which can help to reduce processing time and required resource capacity. Further, this can help to ensure that the detectors are trained on the specific content of interest, and these messages can in no way pose any risk. For example, and as mentioned, there is no need for generative AI to generate a full image that would be believable to a human viewer in at least some embodiments, as the subjective quality of the image is not a factor in flagging spear phishing, and it will be undesirable in many systems for a detector to open and analyze images in a potentially dangerous communication. In some embodiments the generative AI can generate only the metadata that would be expected for an image or attachment, and that can be incorporated into the synthetic email message. In other embodiments, the generative AI might generate an actual image or attachment that may or may not be believable to a human viewer, but then may only use the metadata for the image or attachment when crafting the synthetic email. Similarly, the textual content need not include actual working links, or even necessarily include full paragraphs of sensical text, at least to the extent such paragraphs are not required for an accurate determination. The synthesized training communications thus will not be full communications in many embodiments, but will include only those features or types of information that are to be used by a detector in making a threat (or similar) determination. In some embodiments, where full images or attachments might be used for a part of the training, these communication might also be sent to a human reviewer to obtain subjective feedback as well. In at least some embodiments, these generated training email messages would only be used in the training pipeline and would not be available outside the training pipeline or for other such usage. In some embodiments, the training email messages may be generated in such a way that the emails are only created from data for the various modalities inside the training module and never exposed outside that module, other than to the extent needed for additional training or fine-tuning.

In at least some embodiments, a detector can also leverage information stored to a database for a given category or recipient. For example, a threat detector might analyze the content of the image, but may also attempt to investigate related information for that content. For example, if the last time a message from a given sender was five years ago, then that message might be more suspicious than if a communication was received form that sender the previous week. Similarly, the style of language a particular sender uses or the way the sender signs a message or crafts a signature line may be indicative of a probability of fraud. In this way, a detection model can be trained as to what to look for, even for specific types of users, but may also leverage available data for a given recipient in order to make even more accurate determinations. This information can also include the images used in a signature from a given recipient, types and sizes of attachments typically received from that sender, and so on. Anything that is out of the ordinary (or within normal behavior) for a sender, recipient, or category can be used to make a more informed and accurate threat determination.

Figure 4:
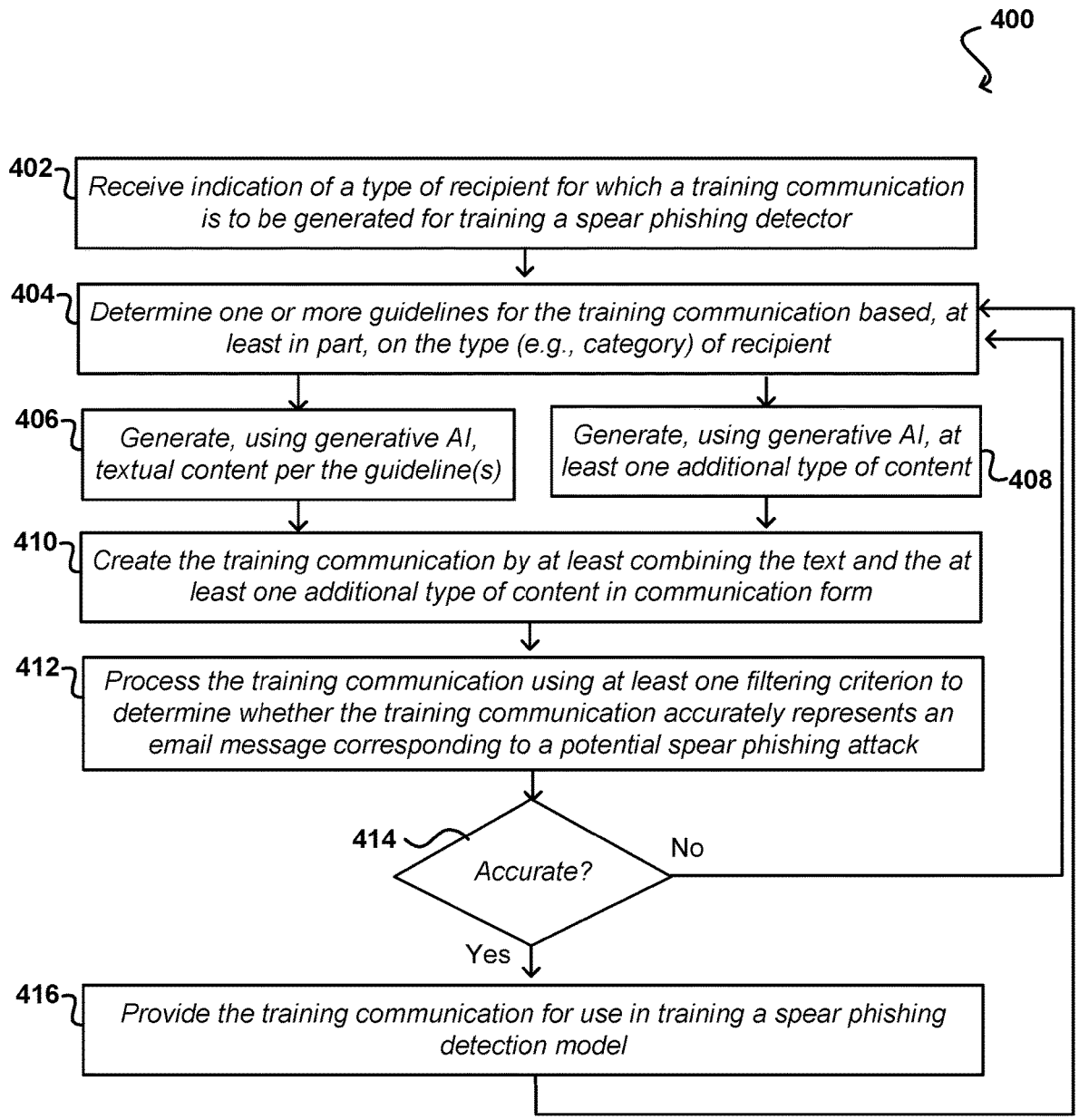
FIG. 4 illustrates an example process for generating training communications for use in training one or more threat detection models that can be performed in accordance with various embodiments.

FIG. 4 illustrates an example process 400 for generating training data to be used to train a spearphishing detection model that can be performed in accordance with various embodiments. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to spear phishing, various other types of communications or content can be generated to detect other types of attacks or risky content as well within the scope of the various embodiments. In this example, an indication is received 402 of a type of recipient for which a training communication is to be generated for use in training a spear phishing detector. One or more guidelines (or requirements, etc.) can be determined 404 for the training communication to be generated, which may be based at least in part on the type (e.g., category) of the intended recipient. This may include, for example, specific types of language content, types of acceptable or expected file attachments, or types of anticipated images in communications received for these categories, among other such options. The guidelines may also change over time based on the training communications already generated, in order to produce a variety of content in the training communications that are generated, and may be based further upon feedback as to the quality of previously produced training communication.

Based at least in part on these guidelines for the determined type of recipient, generative AI (or another such technology) can be used to generate 406 textural content for the communication, as may include body text, a subject line, one or more embedded hyperlinks, and the like, which may be appropriate for the determined category. Generative AI (or another such technology) can also be used to generate 408 at least one additional type or modality of content for use in generating the training communication. This additional type of content may include, for example, an image, a video, or an audio file that may be embedded in the image, or a file that can be attached to the communication as may relate to a document, spreadsheet, presentation, or other such content object. As mentioned, the content generated may instead include metadata for any of these types of content, or instances of these types of content which, if presented to a user, may not appear subjectively to be valid or quality instances of those types of content. The training communication can then be created 410 by at least combining the text and the at least one additional type of content in communication form, such as to generate an email message including at least this content. The training communication can be processed 412 using at least one filtering criterion to determine whether the training communication accurately represents an email message corresponding to a potential spear phishing attack. If it is determined 414 that the message is not a sufficiently accurate representation, such as where the message is filtered out by of the applied filters, then the training message can be deleted and information about the message can be fed back to adjust the one or more guidelines, for example, and then generate a new or modified training communication that should be more accurate. If the training communication is determined to be accurate, then the training communication can be provided 416 for use in training a spear phishing detection model, such as a model that is specifically being fine-tuned for the determined type or category of recipient.

Figure 5:
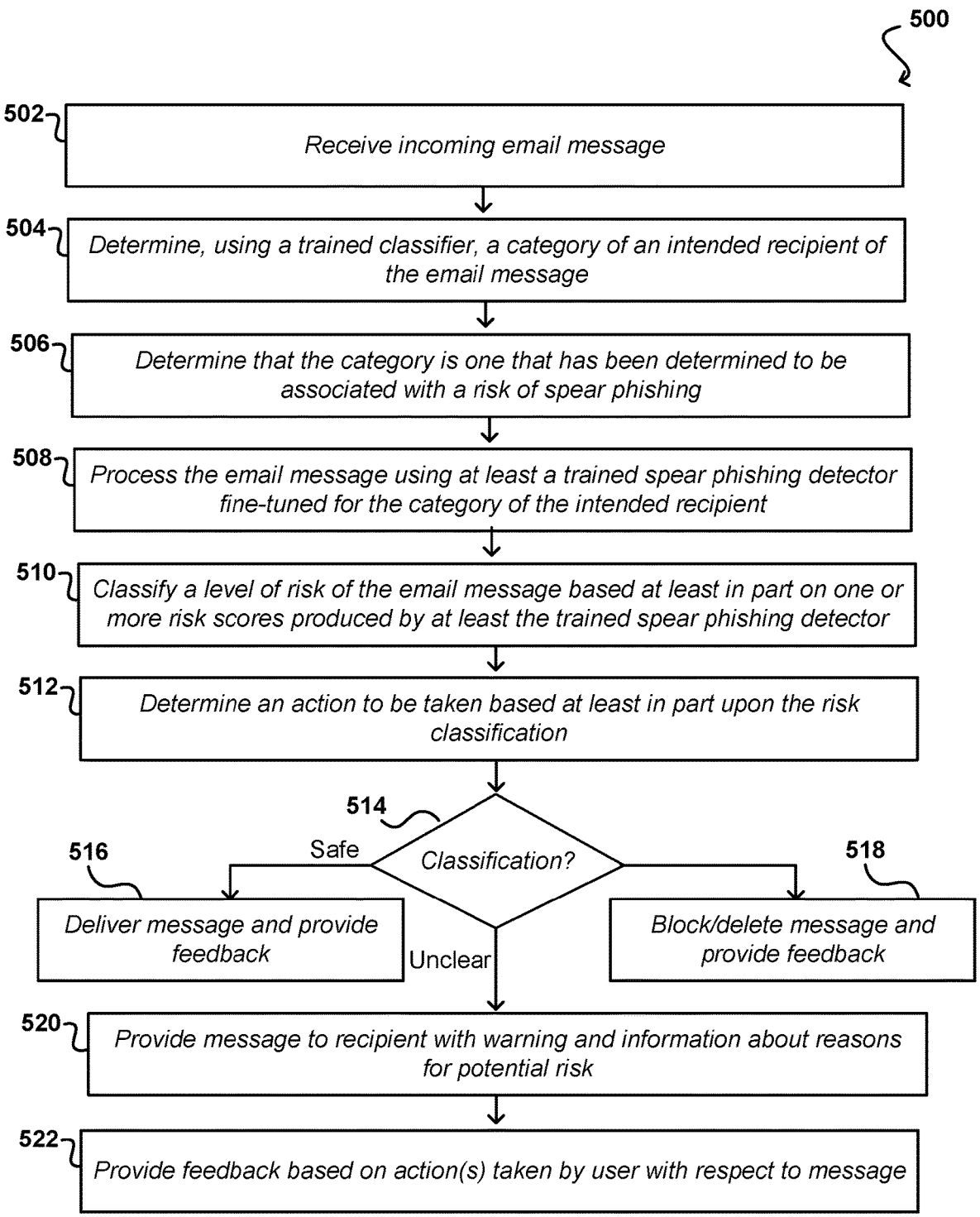
FIG. 5 illustrates an example process for processing a received communication using one or more trained threat detection models, in accordance with at least one embodiment.

FIG. 5 illustrates an example process 500 for using such a trained detector to detect potential spear phishing messages that can be performed in accordance with at least one embodiment. In this example, an incoming email message (or other communication) is received 502. Using a trained classifier (or other such technology), a category of an intended recipient (or type of message) can be determined 504. It can be determined 506 that the category of the message is associated with a risk of spear phishing, or is otherwise a category for which a spear phishing model has been trained. The email message can be processed 508 using at least a trained spear phishing detector that has been fine-tuned for that category. If there is more than one possible category then the email message can be processed using detectors for each of those categories, as well as potentially a general spear phishing detector and/or a general phishing detector, among other such options. In at least one embodiment, each detector can give a risk score or similar such value or output. A level or type of risk can be classified 510 based at least in part upon the risk score(s) generated from the detector(s), where multiple scores might be used to generate a final score using a weighted combination or trained classification model, in addition to scores from traditional threat intelligence including sender reputation, among other such options. An action to be taken for the message can be determined 512 based at least in part upon this risk classification. If it is determined 514 that the classification is a safe classification, then the message can be delivered to the intended recipient and feedback can be provided or stored for use as training data for further fine-tuning the relevant detector(s). If it is determined that the message corresponds to an unsafe classification, such as having been identified as a spear phishing attempt, then the message can be blocked or deleted 518 and feedback can be provided to fine tune the relevant model(s). If the message is not clearly classified as safe or unsafe, or is classified as unsure or risky, for example, then the message can be delivered or provided 520 to the recipient with a warning as well as information indicating why the message was flagged as a potential risk, where the information can relate to more than one type of content of the message. Feedback can be gathered and provided 522 for use in fine-tuning the relevant model(s) based at least in part upon one or more actions taken by the user or recipient with respect to the message, such as whether the user determined that the message was safe or unsafe.

As discussed, aspects of various approaches presented herein can be lightweight enough to execute on a device such as a client device, as may include a personal computer or smartphone, in real time. Such processing can be performed on, or for, content that is generated on, or received by, that client device or received from an external source, such as email or other communication content received over at least one network, such as from another client device, a cloud server 620, or third party service 660, among other such options. In some instances, at least a portion of the processing, generation, and/or determination of this content may be performed by one of these other devices, systems, services, or entities, then provided to the client device (or another such recipient) for presentation or another such use.

Figure 6:
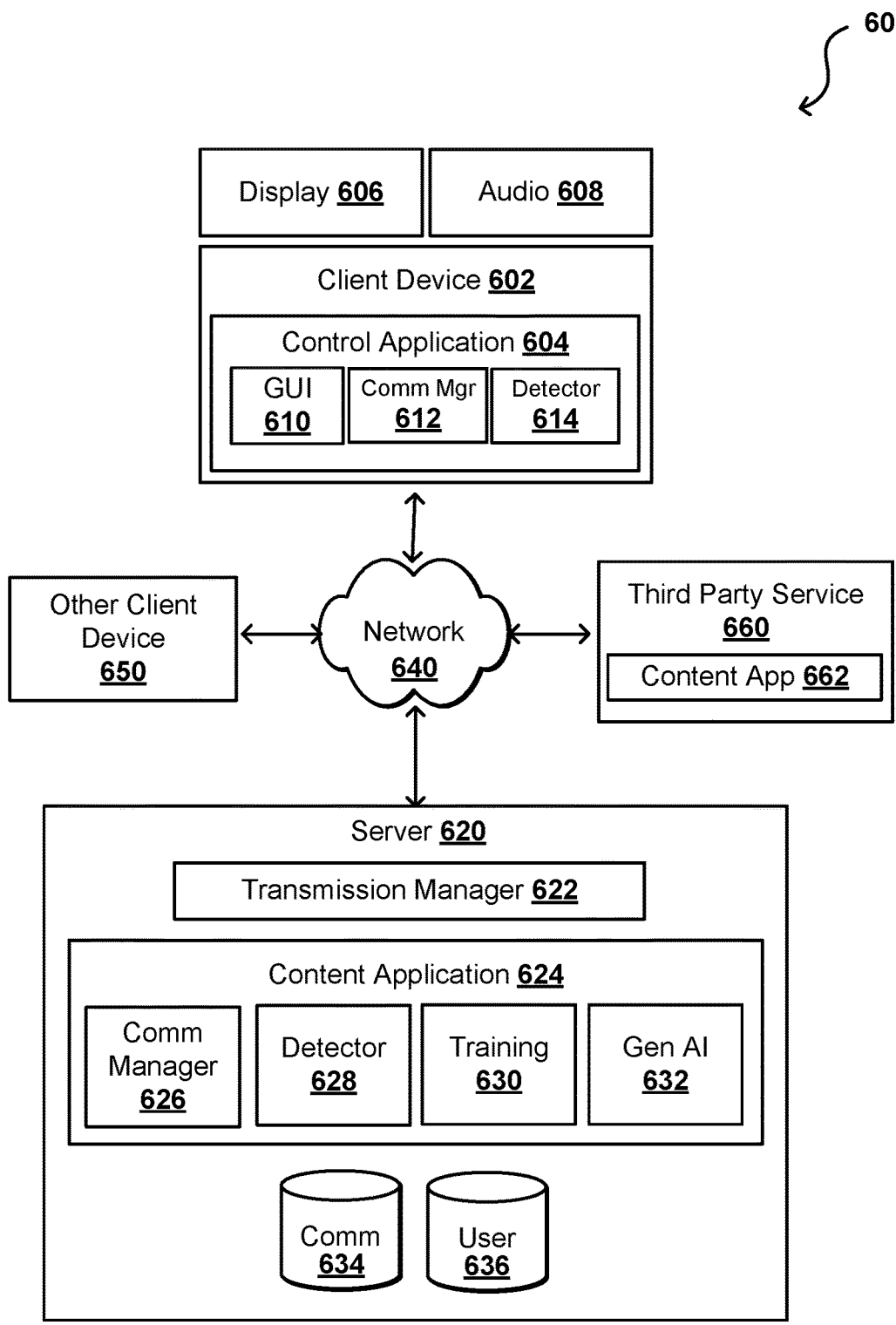
FIG. 6 illustrates an example networked computing environment in which aspects of various embodiments can be performed.

As an example, FIG. 6 illustrates an example network configuration 600 that can be used to provide, generate, modify, encode, process, and/or transmit communication data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 636, and can cause content such as received communications to be managed by a communication manager 626. A communication manager 626 may work with a threat detection module 628 to attempt to identify threats, such as phishing or spear phishing emails, which can then be prevented from being delivered to the client device or otherwise handled, such as is discussed elsewhere herein.

The threat detectors can be trained and fine-tuned for specific types of recipients using a training module 630, which can be trained using at least some amount of synthetic training data generated using generative AI 632 among other such possibilities. Actual received communication data and feedback data can also be used to train and fine-tune a detector as discussed in more detail elsewhere herein. Communications that are determined to not correspond to a threat, or that are otherwise to be delivered to the recipient, can be transmitted by the communication manager 628 and made available for presentation via the client device 602. At least a portion of the communication (or related) content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding content application 604, which may also or alternatively include a graphical user interface 610, communication manager 612, and threat detector 614 for use in providing, processing, blocking, modifying, or using content for presentation (or other purposes) on or by the client device 602. In such an embodiment, the client device 602 may be used to determine the risk level of a message from the point of view of a user, and provide feedback for use in fine-tuning the relevant detector(s) 628. A decoder may also be used to decode data received over the network(s) 640 for presentation via client device 602, such as text, image, or video content through a display 606 and audio, such as sounds and music attached to the communication, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, synthesized, processed, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Data Center

Figure 7:
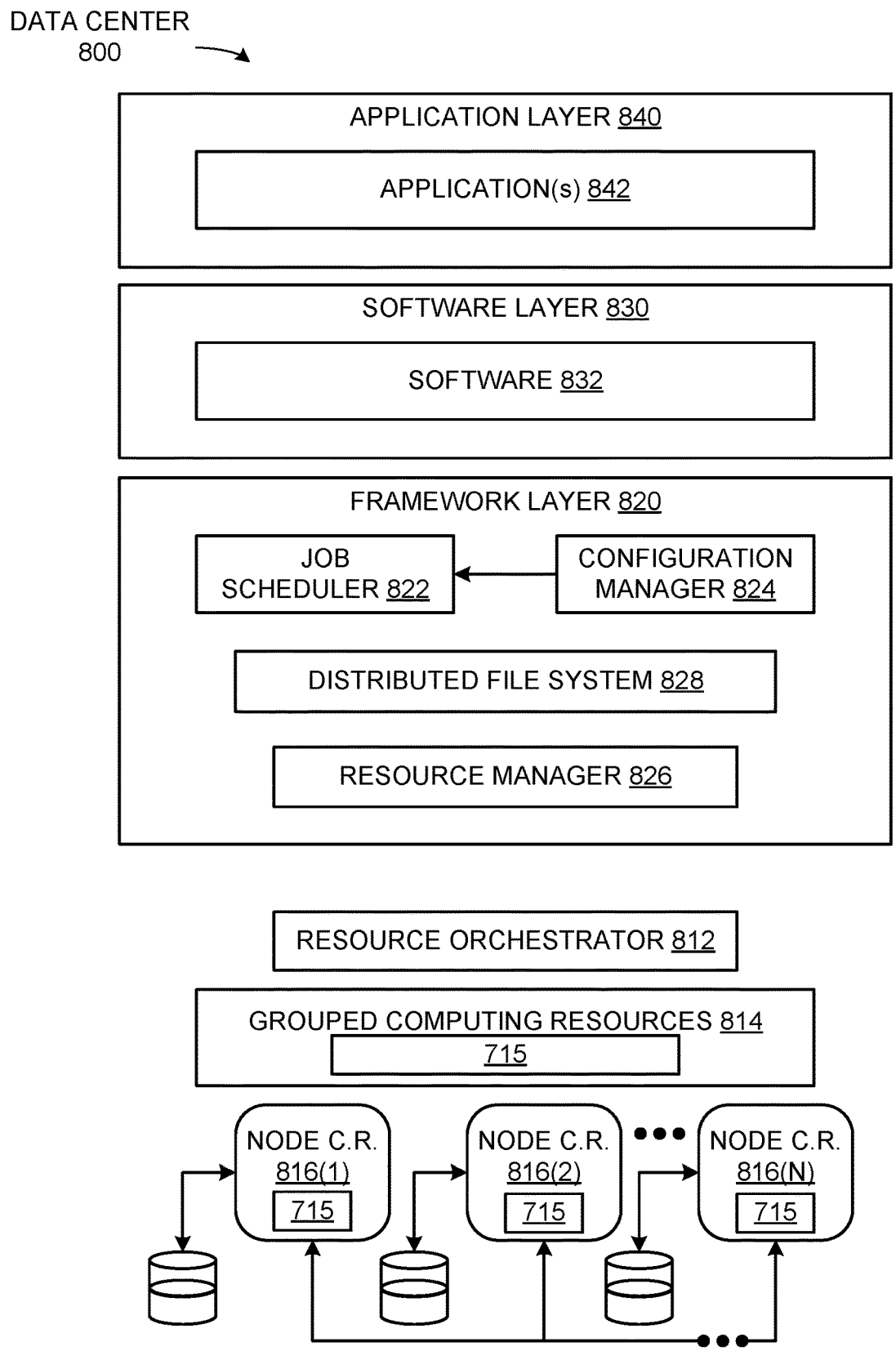
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator @1@12 may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 115 are used to perform inferencing and/or training operations associated with one or more embodiments. In at least one embodiment, inference and/or training logic 115 may be used in system FIG. 7 for inferencing or predicting operations based, at least in part, on weight parameters calculated using neural network training operations, neural network functions and/or architectures, or neural network use cases described herein. Embodiments presented herein can generate training communications using multiple types of content that can be used to train and fine tune threat detection models for various categories of recipients.

Computer Systems

Figure 8:
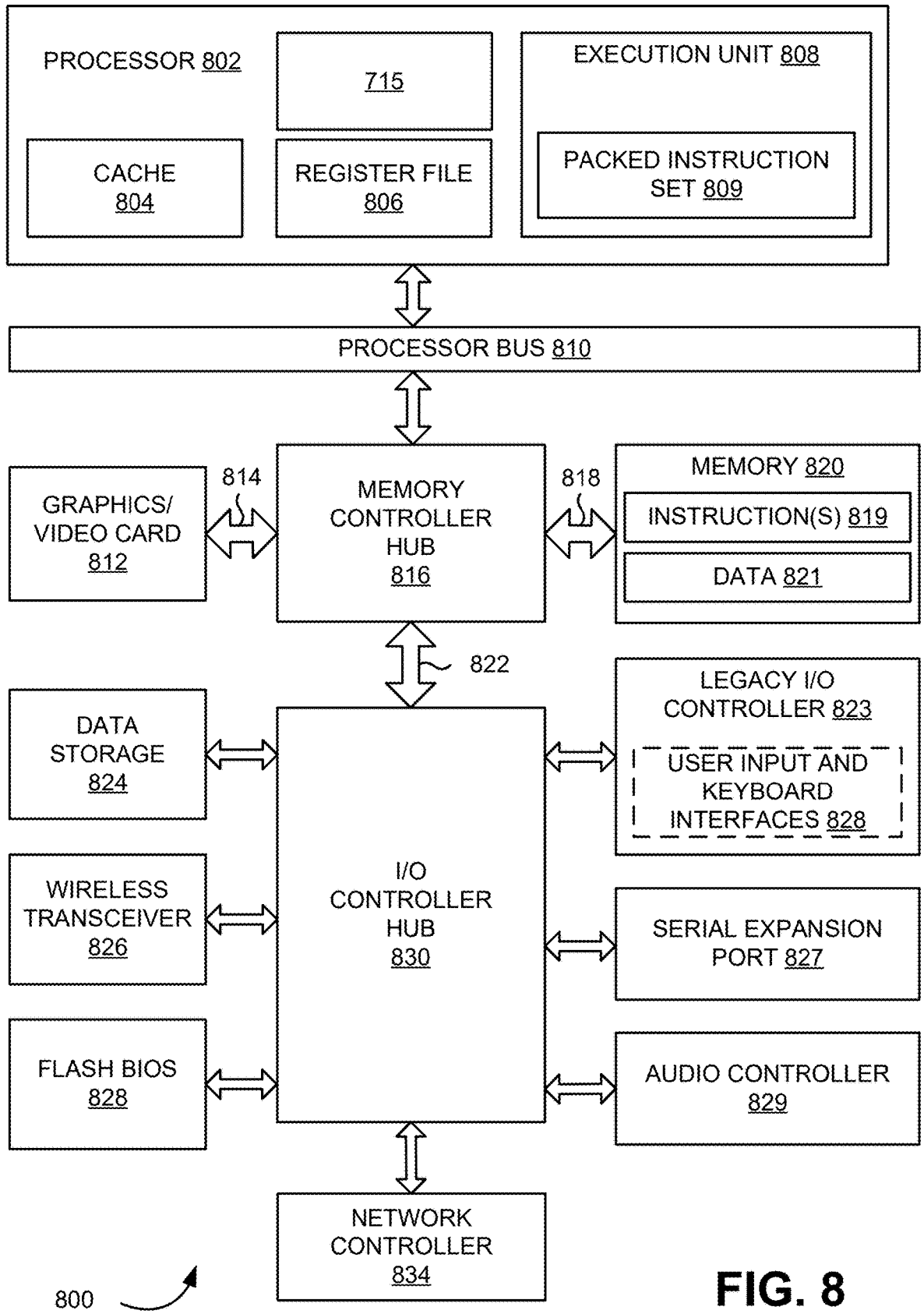
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 115 are used to perform inferencing and/or training operations associated with one or more embodiments. In at least one embodiment, inference and/or training logic 115 may be used in system FIG. 8 for inferencing or predicting operations based, at least in part, on weight parameters calculated using neural network training operations, neural network functions and/or architectures, or neural network use cases described herein.

Embodiments presented herein can generate training communications using multiple types of content that can be used to train and fine tune threat detection models for various categories of recipients.

Figure 9:
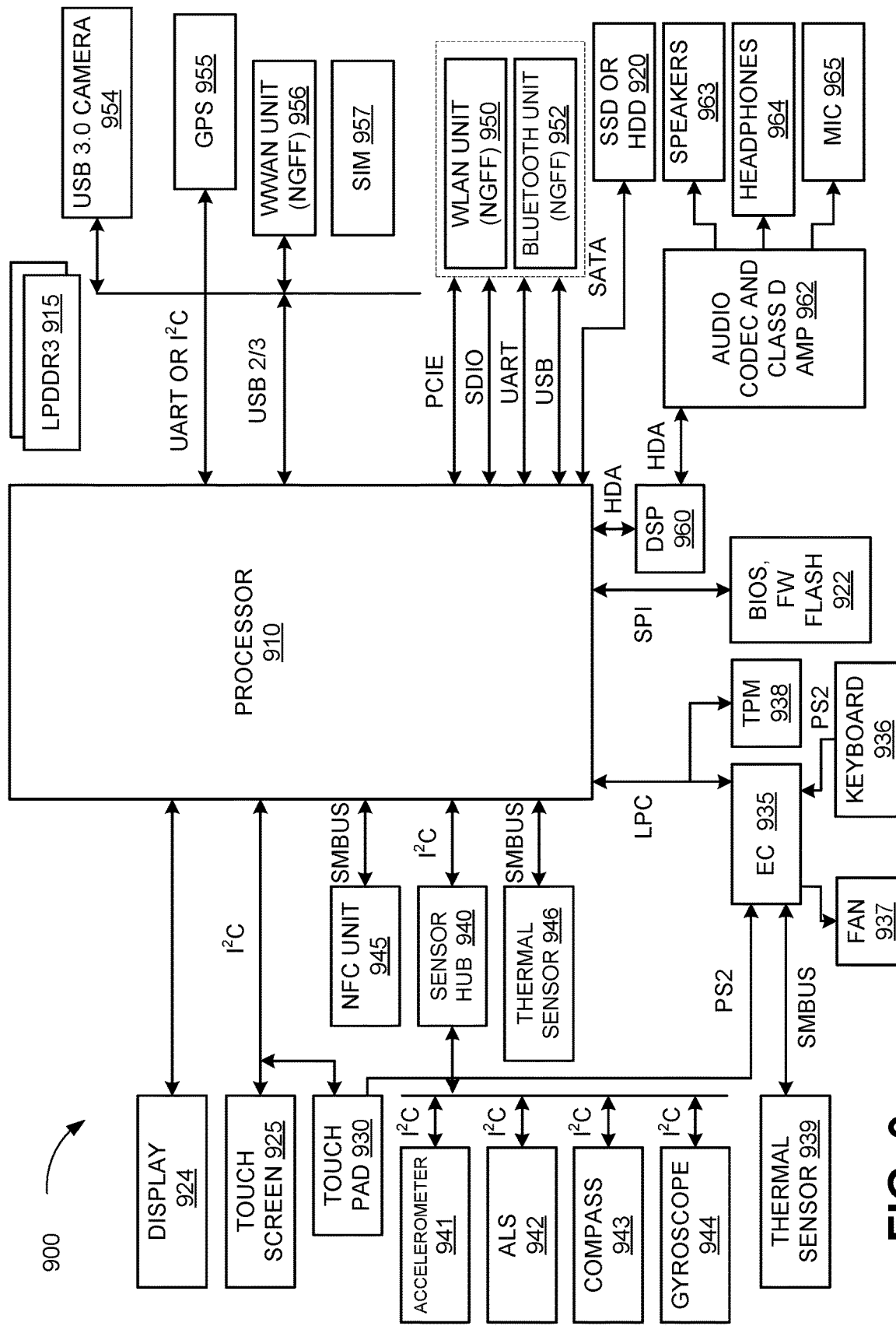
FIG. 9 is a block diagram illustrating a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a I²C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 115 are used to perform inferencing and/or training operations associated with one or more embodiments. In at least one embodiment, inference and/or training logic 115 may be used in system FIG. 9 for inferencing or predicting operations based, at least in part, on weight parameters calculated using neural network training operations, neural network functions and/or architectures, or neural network use cases described herein. Embodiments presented herein can generate training communications using multiple types of content that can be used to train and fine tune threat detection models for various categories of recipients.

Figure 10:
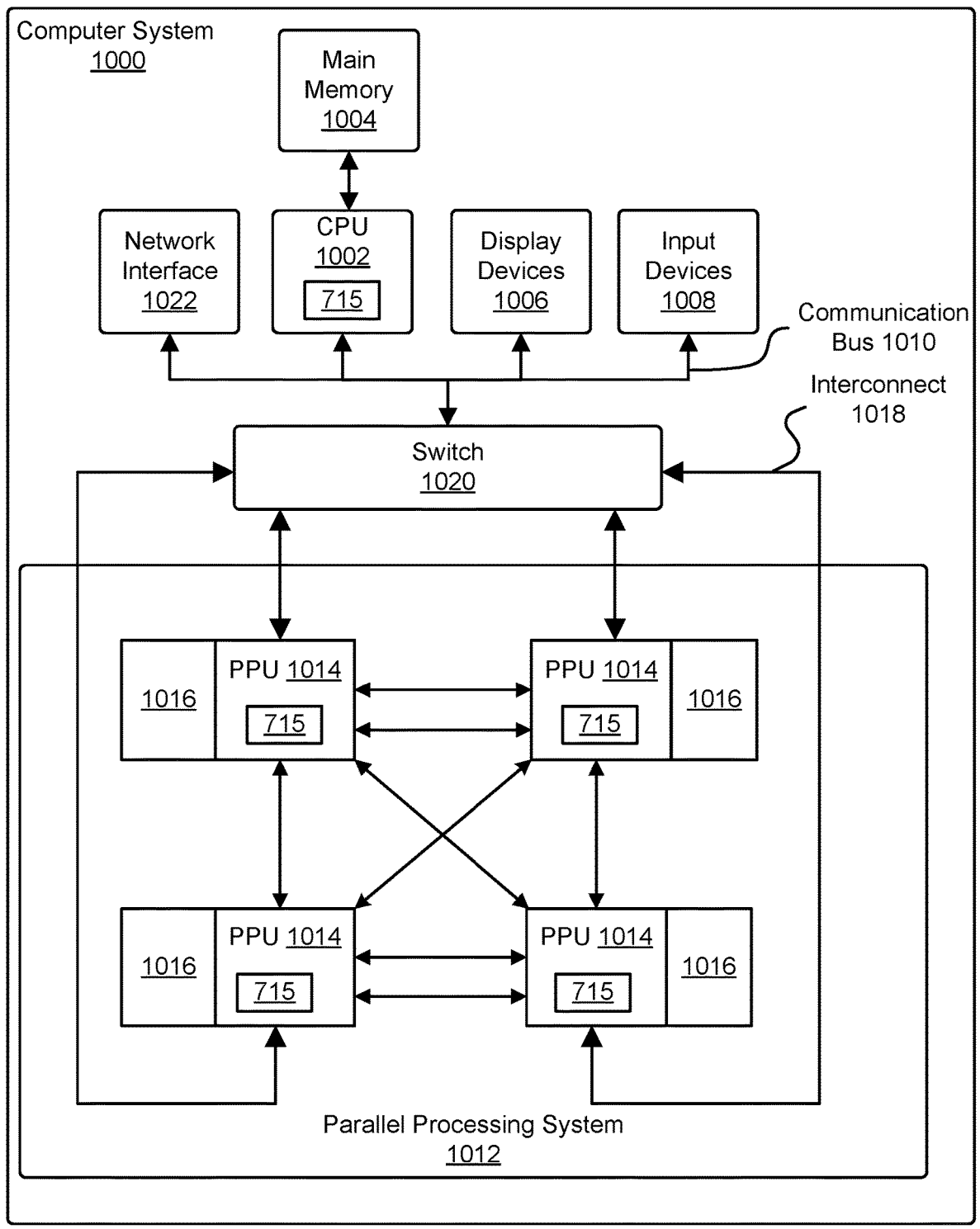
FIG. 10 illustrates a computer system, according to at least one embodiment.

FIG. 10 illustrates a computer system 1000, according to at least one embodiment. In at least one embodiment, computer system 1000 is configured to implement various processes and methods described throughout this disclosure.

In at least one embodiment, computer system 1000 comprises, without limitation, at least one central processing unit ("CPU") 1002 that is connected to a communication bus 1010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1000 includes, without limitation, a main memory 1004 and control logic (e.g., implemented as hardware, software, or a combination thereof) and data are stored in main memory 1004, which may take form of random access memory ("RAM"). In at least one embodiment, a network interface subsystem ("network interface") 1022 provides an interface to other computing devices and networks for receiving data from and transmitting data to other systems with computer system 1000.

In at least one embodiment, computer system 1000, in at least one embodiment, includes, without limitation, input devices 1008, a parallel processing system 1012, and display devices 1006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1008 such as keyboard, mouse, touchpad, microphone, etc. In at least one embodiment, each module described herein can be situated on a single semiconductor platform to form a processing system.

Inference and/or training logic 115 are used to perform inferencing and/or training operations associated with one or more embodiments. In at least one embodiment, inference and/or training logic 115 may be used in system FIG. 10 for inferencing or predicting operations based, at least in part, on weight parameters calculated using neural network training operations, neural network functions and/or architectures, or neural network use cases described herein.

Embodiments presented herein can generate training communications using multiple types of content that can be used to train and fine tune threat detection models for various categories of recipients.

Figure 11:
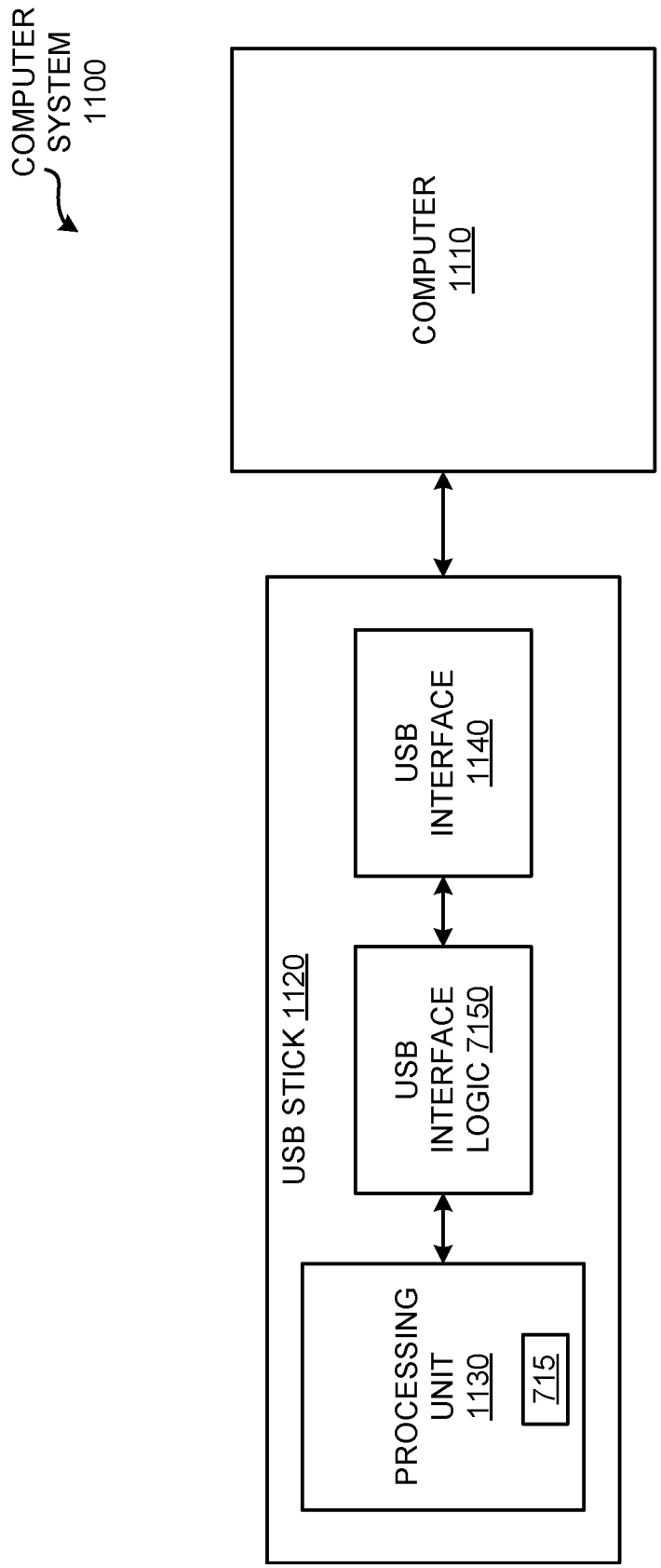
FIG. 11 illustrates a computer system, according to at least one embodiment.

FIG. 11 illustrates a computer system 1100, according to at least one embodiment. In at least one embodiment, computer system 1100 includes, without limitation, a computer 1110 and a USB stick 1120. In at least one embodiment, computer 1110 may include, without limitation, any number and type of processor(s) (not shown) and a memory (not shown). In at least one embodiment, computer 1110 includes, without limitation, a server, a cloud instance, a laptop, and a desktop computer.

In at least one embodiment, USB stick 1120 includes, without limitation, a processing unit 1130, a USB interface 1140, and USB interface logic 1150. In at least one embodiment, processing unit 1130 may be any instruction execution system, apparatus, or device capable of executing instructions. In at least one embodiment, processing unit 1130 may include, without limitation, any number and type of processing cores (not shown). In at least one embodiment, processing unit 1130 comprises an application specific integrated circuit ("ASIC") that is optimized to perform any amount and type of operations associated with machine learning. For instance, in at least one embodiment, processing unit 1130 is a tensor processing unit ("TPC") that is optimized to perform machine learning inference operations. In at least one embodiment, processing unit 1130 is a vision processing unit ("VPU") that is optimized to perform machine vision and machine learning inference operations.

In at least one embodiment, USB interface 1140 may be any type of USB connector or USB socket. For instance, in at least one embodiment, USB interface 1140 is a USB 3.0 Type-C socket for data and power. In at least one embodiment, USB interface 1140 is a USB 3.0 Type-A connector. In at least one embodiment, USB interface logic 1150 may include any amount and type of logic that enables processing unit 1130 to interface with devices (e.g., computer 1110) via USB connector 1140.

Inference and/or training logic 115 are used to perform inferencing and/or training operations associated with one or more embodiments. In at least one embodiment, inference and/or training logic 115 may be used in system FIG. 11 for inferencing or predicting operations based, at least in part, on weight parameters calculated using neural network training operations, neural network functions and/or architectures, or neural network use cases described herein. Embodiments presented herein can generate training communications using multiple types of content that can be used to train and fine tune threat detection models for various categories of recipients.

Figure 12A:
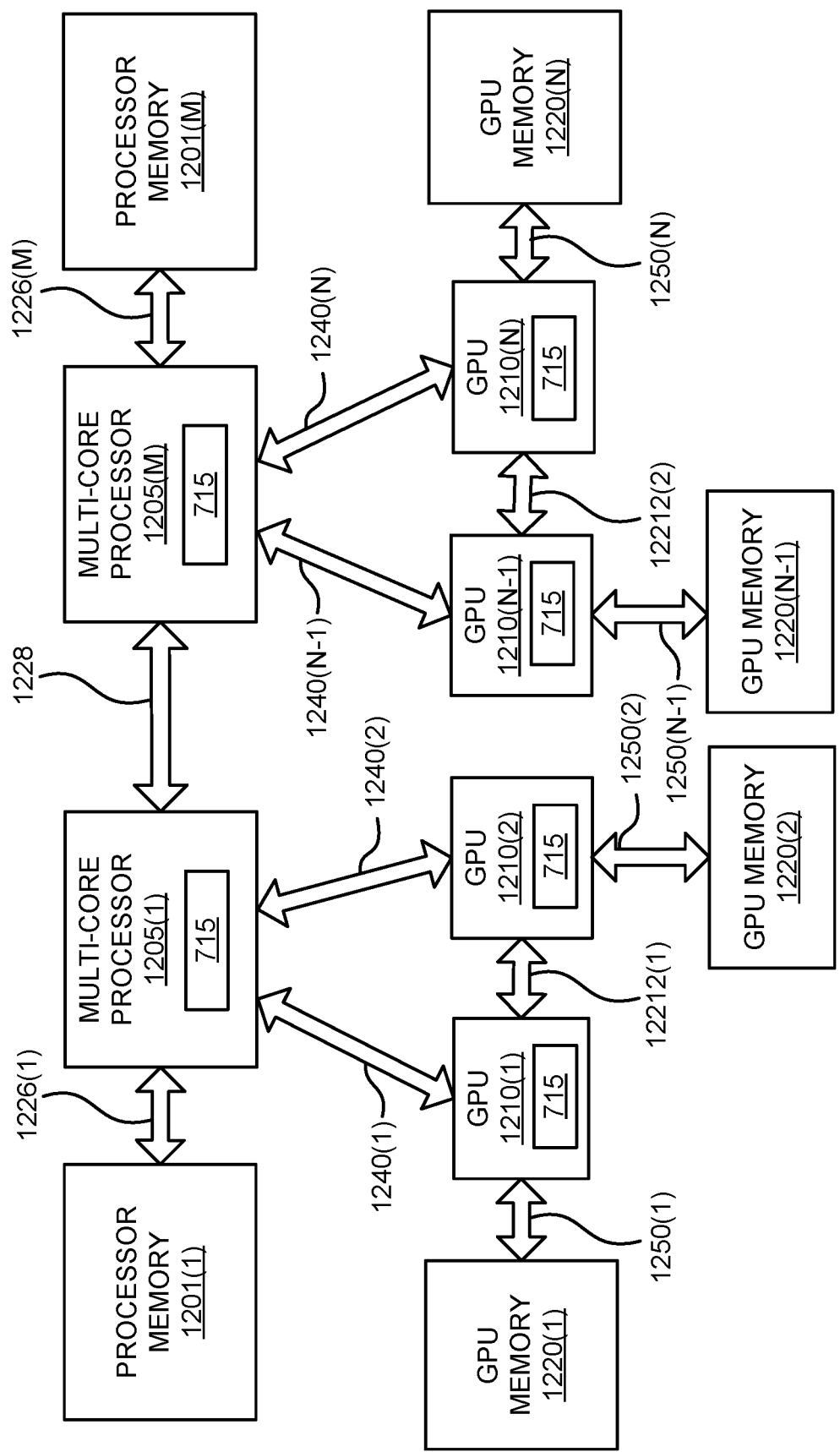
FIG. 12A illustrates a computer system, according to at least one embodiment.

FIG. 12A illustrates an exemplary architecture in which a plurality of GPUs 1210(1)-1210(N) is communicatively coupled to a plurality of multi-core processors 1205(1)-1205(M) over high-speed links 1240(1)-1240(N) (e.g., buses, point-to-point interconnects, etc.). In at least one embodiment, high-speed links 1240(1)-1240(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure. In at least one embodiment, one or more GPUs in a plurality of GPUs 1210(1)-1210(N) includes one or more graphics cores (also referred to simply as "cores") 1500 as disclosed in FIGS. 15A and 15B. In at least one embodiment, one or more graphics cores 1500 may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

In addition, and in at least one embodiment, two or more of GPUs 1210 are interconnected over high-speed links 1229(1)-1229(2), which may be implemented using similar or different protocols/links than those used for high-speed links 1240(1)-1240(N). Similarly, two or more of multi-core processors 1205 may be connected over a high-speed link 1228 which may be symmetric multi-processor (SMP) buses operating at 20 GB/s, 30 GB/s, 120 GB/s or higher. Alternatively, all communication between various system components shown in FIG. 12A may be accomplished using similar protocols/links (e.g., over a common interconnection fabric).

In at least one embodiment, each multi-core processor 1205 is communicatively coupled to a processor memory 1201(1)-1201(M), via memory interconnects 1226(1)-1226(M), respectively, and each GPU 1210(1)-1210(N) is communicatively coupled to GPU memory 1220(1)-1220(N) over GPU memory interconnects 1250(1)-1250(N), respectively. In at least one embodiment, memory interconnects 1226 and 1250 may utilize similar or different memory access technologies. By way of example, and not limitation, processor memories 1201(1)-1201(M) and GPU memories 1220 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 1201 may be volatile memory and another portion may be non-volatile memory (e.g., using a two-level memory (2LM) hierarchy).

As described herein, although various multi-core processors 1205 and GPUs 1210 may be physically coupled to a particular memory 1201, 1220, respectively, and/or a unified memory architecture may be implemented in which a virtual system address space (also referred to as "effective address" space) is distributed among various physical memories. For example, processor memories 1201(1)-1201(M) may each comprise 64 GB of system memory address space and GPU memories 1220(1)-1220(N) may each comprise 32 GB of system memory address space resulting in a total of 256 GB addressable memory when M=2 and N=4. Other values for N and M are possible.

Figure 12B:
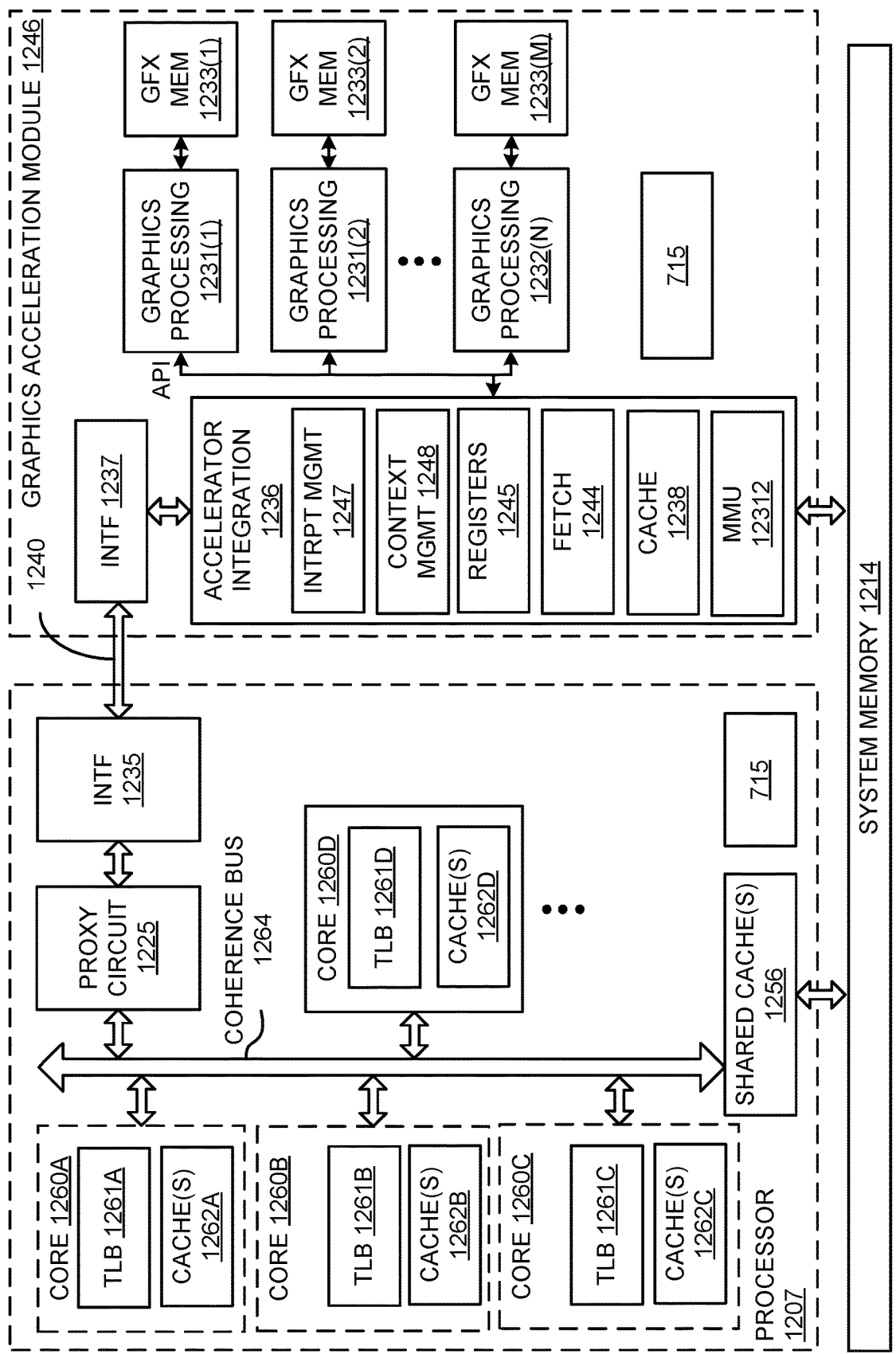
FIG. 12B illustrates a computer system, according to at least one embodiment.

FIG. 12B illustrates additional details for an interconnection between a multi-core processor 1207 and a graphics acceleration module 1246 in accordance with one exemplary embodiment. In at least one embodiment, graphics acceleration module 1246 may include one or more GPU chips integrated on a line card which is coupled to processor 1207 via high-speed link 1240 (e.g., a PCIe bus, NVLink, etc.). In at least one embodiment, graphics acceleration module 1246 may alternatively be integrated on a package or chip with processor 1207.

In at least one embodiment, processor 1207 includes a plurality of cores 1260A-1260D (which may be referred to as "execution units"), each with a translation lookaside buffer ("TLB") 1261A-1261D and one or more caches 1262A-1262D. In at least one embodiment, cores 1260A-1260D may include various other components for executing instructions and processing data that are not illustrated. In at least one embodiment, caches 1262A-1262D may comprise Level 1 (L1) and Level 2 (L2) caches. In addition, one or more shared caches 1256 may be included in caches 1262A-1262D and shared by sets of cores 1260A-1260D. For example, one embodiment of processor 1207 includes 24 cores, each with its own L1 cache, twelve shared L2 caches, and twelve shared L3 caches. In this embodiment, one or more L2 and L3 caches are shared by two adjacent cores. In at least one embodiment, processor 1207 and graphics acceleration module 1246 connect with system memory 1214, which may include processor memories 1201(1)-1201(M) of FIG. 12A.

In at least one embodiment, coherency is maintained for data and instructions stored in various caches 1262A-1262D, 1256 and system memory 1214 via inter-core communication over a coherence bus 1264. In at least one embodiment, for example, each cache may have cache coherency logic/circuitry associated therewith to communicate to over coherence bus 1264 in response to detected reads or writes to particular cache lines. In at least one embodiment, a cache snooping protocol is implemented over coherence bus 1264 to snoop cache accesses.

In at least one embodiment, a proxy circuit 1225 communicatively couples graphics acceleration module 1246 to coherence bus 1264, allowing graphics acceleration module 1246 to participate in a cache coherence protocol as a peer of cores 1260A-1260D. In particular, in at least one embodiment, an interface 1235 provides connectivity to proxy circuit 1225 over high-speed link 1240 and an interface 1237 connects graphics acceleration module 1246 to high-speed link 1240.

In at least one embodiment, an accelerator integration circuit 1236 provides cache management, memory access, context management, and interrupt management services on behalf of a plurality of graphics processing engines 1231

(1)-1231(N) of graphics acceleration module 1246. In at least one embodiment, graphics processing engines 1231(1)-1231(N) may each comprise a separate graphics processing unit (GPU). In at least one embodiment, plurality of graphics processing engines 1231(1)-1231(N) of graphics acceleration module 1246 include one or more graphics cores 1500 as discussed in connection with FIGS. 15A and 15B. In at least one embodiment, graphics processing engines 1231(1)-1231(N) alternatively may comprise different types of graphics processing engines within a GPU, such as graphics execution units, media processing engines (e.g., video encoders/decoders), samplers, and blit engines. In at least one embodiment, graphics acceleration module 1246 may be a GPU with a plurality of graphics processing engines 1231(1)-1231(N) or graphics processing engines 1231(1)-1231(N) may be individual GPUs integrated on a common package, line card, or chip.

In at least one embodiment, accelerator integration circuit 1236 includes a memory management unit (MMU) 1239 for performing various memory management functions such as virtual-to-physical memory translations (also referred to as effective-to-real memory translations) and memory access protocols for accessing system memory 1214. In at least one embodiment, MMU 1239 may also include a translation lookaside buffer (TLB) (not shown) for caching virtual/effective to physical/real address translations. In at least one embodiment, a cache 1238 can store commands and data for efficient access by graphics processing engines 1231(1)-1231(N). In at least one embodiment, data stored in cache 1238 and graphics memories 1233(1)-1233(M) is kept coherent with core caches 1262A-1262D, 1256 and system memory 1214, possibly using a fetch unit 1244. As mentioned, this may be accomplished via proxy circuit 1225 on behalf of cache 1238 and memories 1233(1)-1233(M) (e.g., sending updates to cache 1238 related to modifications/accesses of cache lines on processor caches 1262A-1262D, 1256 and receiving updates from cache 1238).

In at least one embodiment, a set of registers 1245 store context data for threads executed by graphics processing engines 1231(1)-1231(N) and a context management circuit 1248 manages thread contexts. For example, context management circuit 1248 may perform save and restore operations to save and restore contexts of various threads during contexts switches (e.g., where a first thread is saved and a second thread is stored so that a second thread can be execute by a graphics processing engine). For example, on a context switch, context management circuit 1248 may store current register values to a designated region in memory (e.g., identified by a context pointer). It may then restore register values when returning to a context. In at least one embodiment, an interrupt management circuit 1247 receives and processes interrupts received from system devices.

In at least one embodiment, virtual/effective addresses from a graphics processing engine 1231 are translated to real/physical addresses in system memory 1214 by MMU 1239. In at least one embodiment, accelerator integration circuit 1236 supports multiple (e.g., 4, 8, 16) graphics accelerator modules 1246 and/or other accelerator devices. In at least one embodiment, graphics accelerator module 1246 may be dedicated to a single application executed on processor 1207 or may be shared between multiple applications. In at least one embodiment, a virtualized graphics execution environment is presented in which resources of graphics processing engines 1231(1)-1231(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1236 performs as a bridge to a system for graphics acceleration module 1246 and provides address translation and system memory cache services. In addition, in at least one embodiment, accelerator integration circuit 1236 may provide virtualization facilities for a host processor to manage virtualization of graphics processing engines 1231(1)-1231(N), interrupts, and memory management.

In at least one embodiment, because hardware resources of graphics processing engines 1231(1)-1231(N) are mapped explicitly to a real address space seen by host processor 1207, any host processor can address these resources directly using an effective address value. In at least one embodiment, one function of accelerator integration circuit 1236 is physical separation of graphics processing engines 1231(1)-1231(N) so that they appear to a system as independent units.

In at least one embodiment, one or more graphics memories 1233(1)-1233(M) are coupled to each of graphics processing engines 1231(1)-1231(N), respectively and N=M. In at least one embodiment, graphics memories 1233(1)-1233(M) store instructions and data being processed by each of graphics processing engines 1231(1)-1231(N). In at least one embodiment, graphics memories 1233(1)-1233(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 1240, biasing techniques can be used to ensure that data stored in graphics memories 1233(1)-1233(M) is data that will be used most frequently by graphics processing engines 1231(1)-1231(N) and preferably not used by cores 1260A-1260D (at least not frequently). Similarly, in at least one embodiment, a biasing mechanism attempts to keep data needed by cores (and preferably not graphics processing engines 1231(1)-1231(N)) within caches 1262A-1262D, 1256 and system memory 1214.

Figure 13:
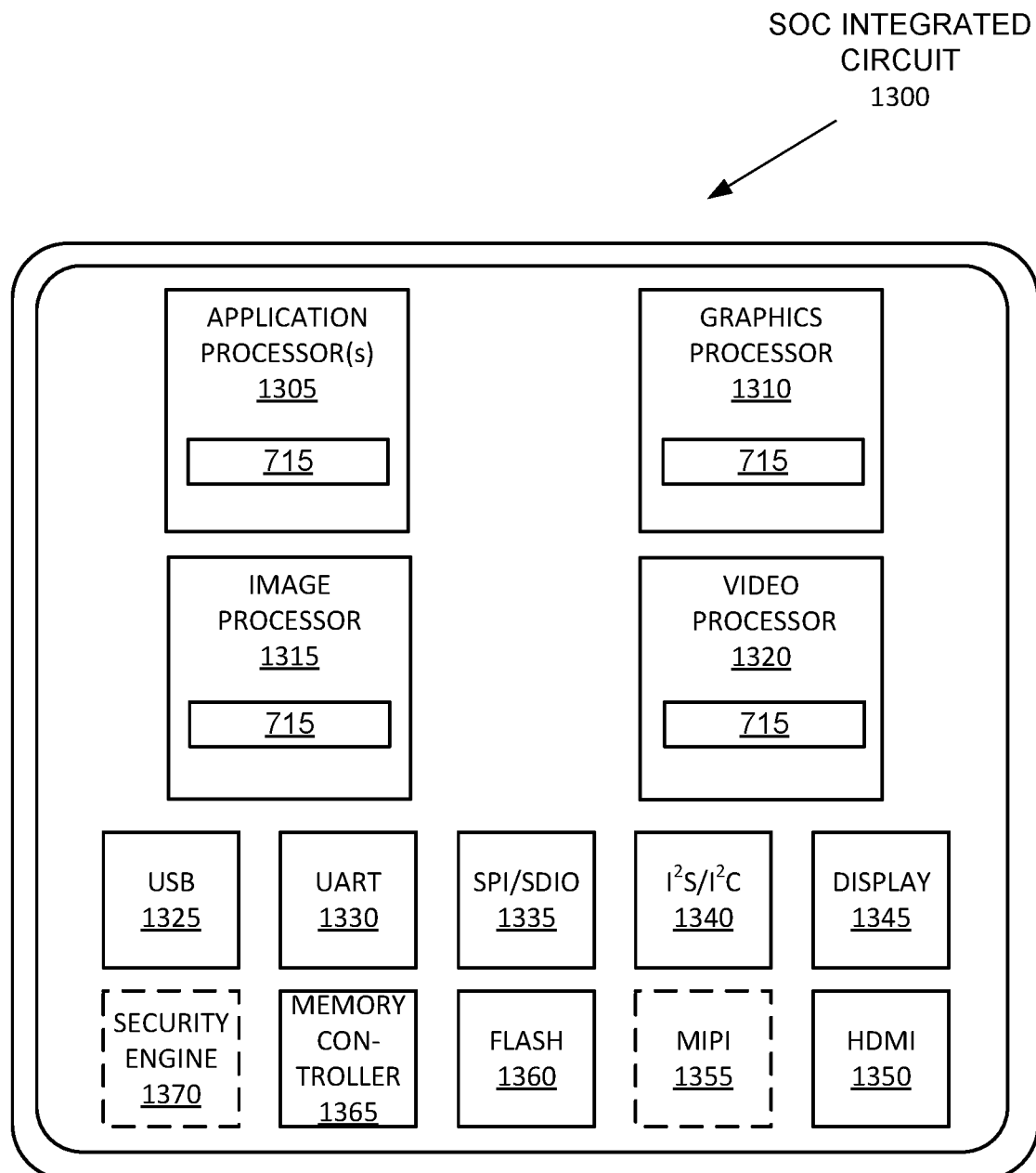
FIG. 13 illustrates exemplary integrated circuits and associated graphics processors, according to at least one embodiment.

FIG. 13 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 13 is a block diagram illustrating an exemplary system on a chip integrated circuit 1300 that may be fabricated using one or more IP cores, according to at least one embodiment. In at least one embodiment, integrated circuit 1300 includes one or more application processor(s) 1305 (e.g., CPUs), at least one graphics processor 1310, and may additionally include an image processor 1315 and/or a video processor 1320, any of which may be a modular IP core. In at least one embodiment, integrated circuit 1300 includes peripheral or bus logic including a USB controller 1325, a UART controller 1330, an SPI/SDIO controller 1335, and an $I^2S/I^2C$ controller 1340. In at least one embodiment, integrated circuit 1300 can include a display device 1345 coupled to one or more of a high-definition multimedia interface (HDMI) controller 1350 and a mobile industry processor interface (MIPI) display interface 1355. In at least one embodiment, storage may be provided by a flash memory subsystem 1360 including flash memory and a flash memory controller. In at least one embodiment, a memory interface may be provided via a memory controller 1365 for access to SDRAM or SRAM memory devices. In at least one embodiment, some integrated circuits additionally include an embedded security engine 1370.

Inference and/or training logic 115 are used to perform inferencing and/or training operations associated with one or more embodiments. In at least one embodiment, inference and/or training logic 115 may be used in integrated circuit 1300 for inferencing or predicting operations based, at least in part, on weight parameters calculated using neural network training operations, neural network functions and/or architectures, or neural network use cases described herein.

Embodiments presented herein can generate training communications using multiple types of content that can be used to train and fine tune threat detection models for various categories of recipients.

Figure 14A:
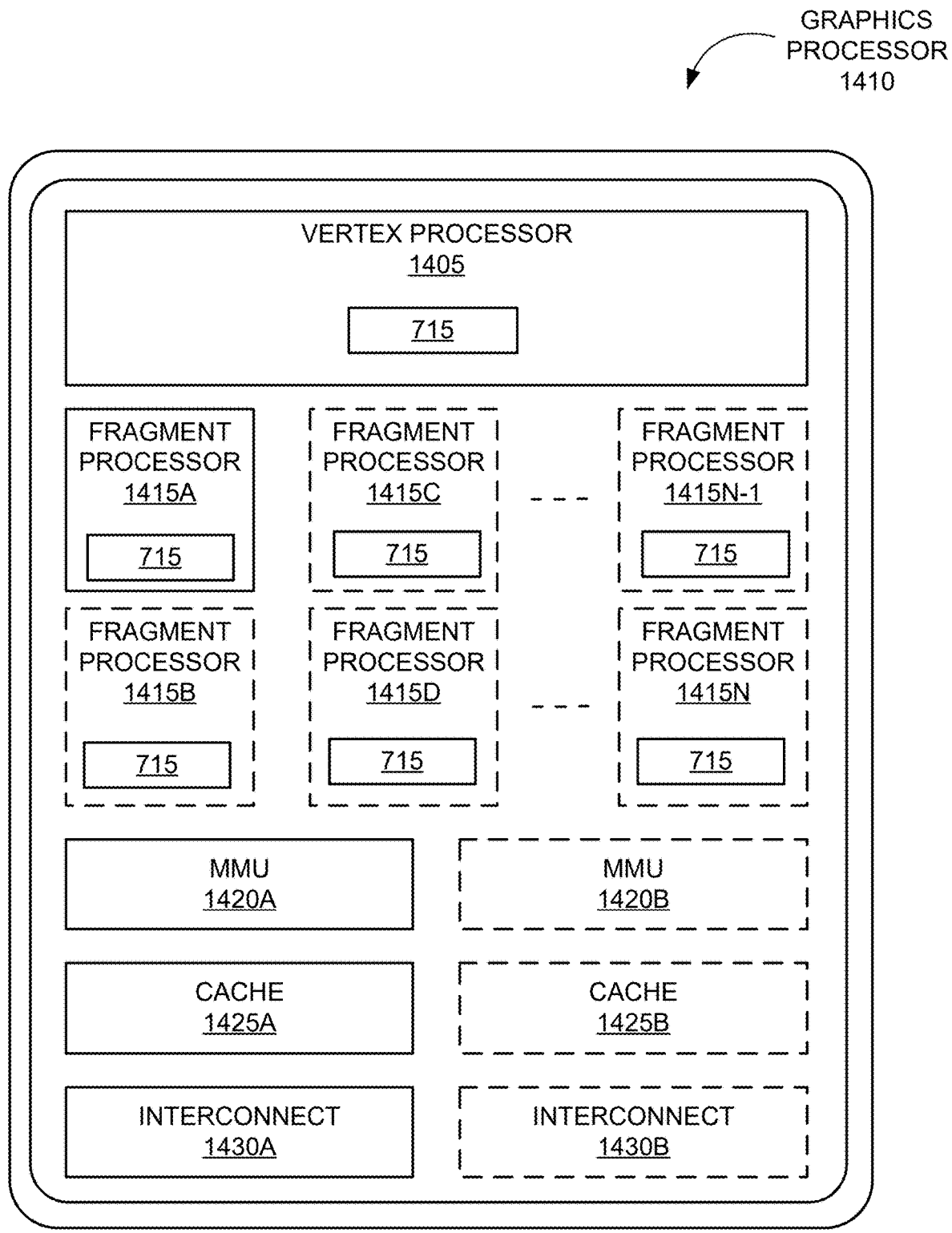
FIGS. 14A-14B illustrate exemplary integrated circuits and associated graphics processors, according to at least one embodiment.
Figure 14B:
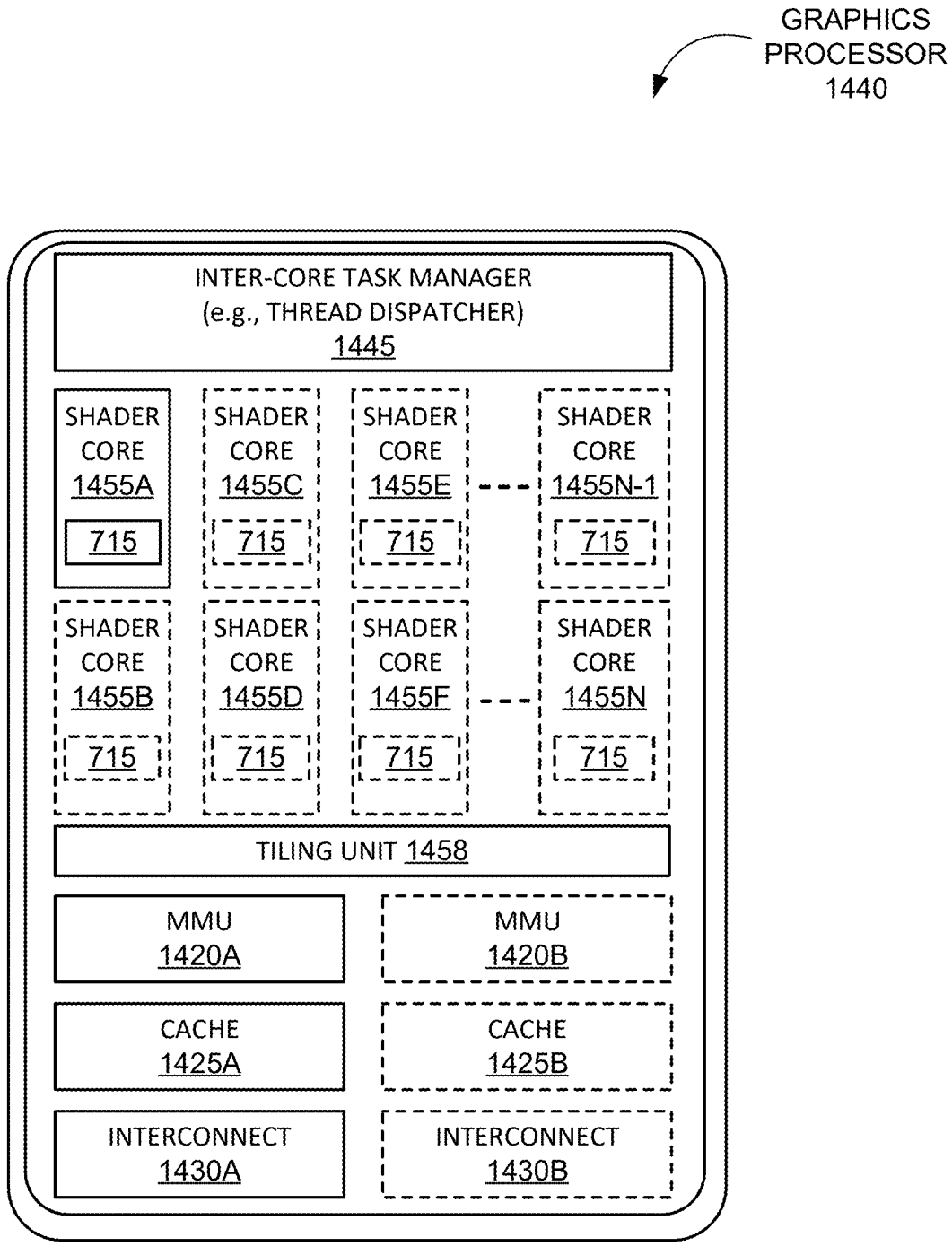

FIGS. 14A-14B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 14A-14B are block diagrams illustrating exemplary graphics processors for use within an SoC, according to embodiments described herein. FIG. 14A illustrates an exemplary graphics processor 1410 of a system on a chip integrated circuit that may be fabricated using one or more IP cores, according to at least one embodiment. FIG. 14B illustrates an additional exemplary graphics processor 1440 of a system on a chip integrated circuit that may be fabricated using one or more IP cores, according to at least one embodiment. In at least one embodiment, graphics processor 1410 of FIG. 14A is a low power graphics processor core. In at least one embodiment, graphics processor 1440 of FIG. 14B is a higher performance graphics processor core. In at least one embodiment, each of graphics processors 1410, 1440 can be variants of graphics processor 1310 of FIG. 13.

In at least one embodiment, graphics processor 1410 includes a vertex processor 1405 and one or more fragment processor(s) 1415A-1415N (e.g., 1415A, 1415B, 1415C, 1415D, through 1415N-1, and 1415N). In at least one embodiment, graphics processor 1410 can execute different shader programs via separate logic, such that vertex processor 1405 is optimized to execute operations for vertex shader programs, while one or more fragment processor(s) 1415A-1415N execute fragment (e.g., pixel) shading operations for fragment or pixel shader programs. In at least one embodiment, vertex processor 1405 performs a vertex processing stage of a 3D graphics pipeline and generates primitives and vertex data. In at least one embodiment, fragment processor(s) 1415A-1415N use primitive and vertex data generated by vertex processor 1405 to produce a framebuffer that is displayed on a display device. In at least one embodiment, fragment processor(s) 1415A-1415N are optimized to execute fragment shader programs as provided for in an OpenGL API, which may be used to perform similar operations as a pixel shader program as provided for in a Direct 3D API.

In at least one embodiment, graphics processor 1410 additionally includes one or more memory management units (MMUs) 1420A-1420B, cache(s) 1425A-1425B, and circuit interconnect(s) 1430A-1430B. In at least one embodiment, one or more MMU(s) 1420A-1420B provide for virtual to physical address mapping for graphics processor 1410, including for vertex processor 1405 and/or fragment processor(s) 1415A-1415N, which may reference vertex or image/texture data stored in memory, in addition to vertex or image/texture data stored in one or more cache(s) 1425A-1425B. In at least one embodiment, one or more MMU(s) 1420A-1420B may be synchronized with other MMUs within a system, including one or more MMUs associated with one or more application processor(s) 1305, image processors 1315, and/or video processors 1320 of FIG. 13, such that each processor 1305-1320 can participate in a shared or unified virtual memory system. In at least one embodiment, one or more circuit interconnect(s) 1430A-1430B enable graphics processor 1410 to interface with other IP cores within SoC, either via an internal bus of SoC or via a direct connection.

In at least one embodiment, graphics processor 1440 includes one or more shader core(s) 1455A-1455N (e.g., 1455A, 1455B, 1455C, 1455D, 1455E, 1455F, through 1455N-1, and 1455N) as shown in FIG. 14B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1440 includes an inter-core task manager 1445, which acts as a thread dispatcher to dispatch execution threads to one or more shader cores 1455A-1455N and a tiling unit 1458 to accelerate tiling operations for tile-based rendering, in which rendering operations for a scene are subdivided in image space, for example to exploit local spatial coherence within a scene or to optimize use of internal caches.

Inference and/or training logic 115 are used to perform inferencing and/or training operations associated with one or more embodiments. In at least one embodiment, inference and/or training logic 115 may be used in integrated circuit 14A and/or 14B for inferencing or predicting operations based, at least in part, on weight parameters calculated using neural network training operations, neural network functions and/or architectures, or neural network use cases described herein.

Embodiments presented herein can generate training communications using multiple types of content that can be used to train and fine tune threat detection models for various categories of recipients.

Figure 15A:
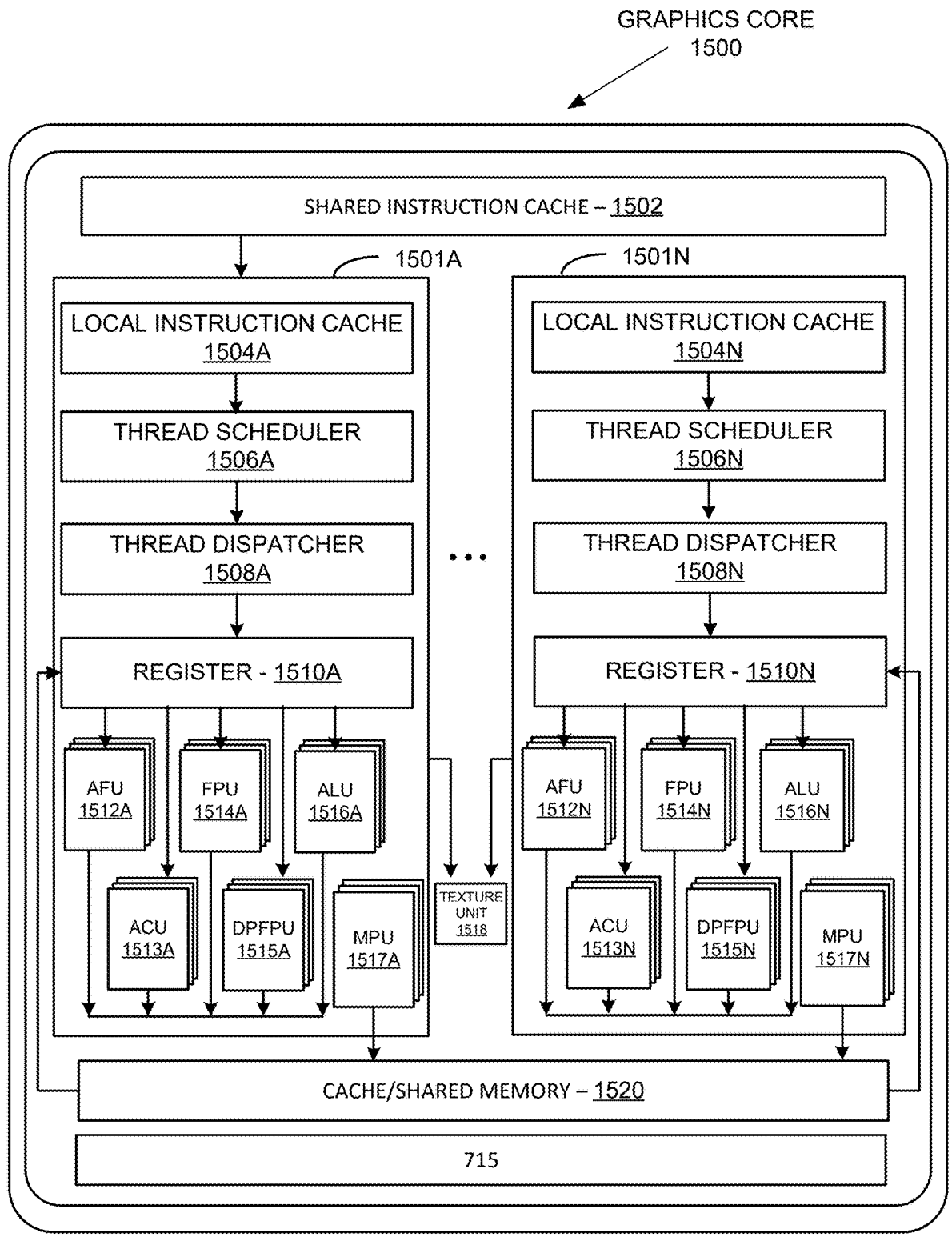
FIGS. 15A-15B illustrate additional exemplary graphics processor logic according to at least one embodiment.
Figure 15B:
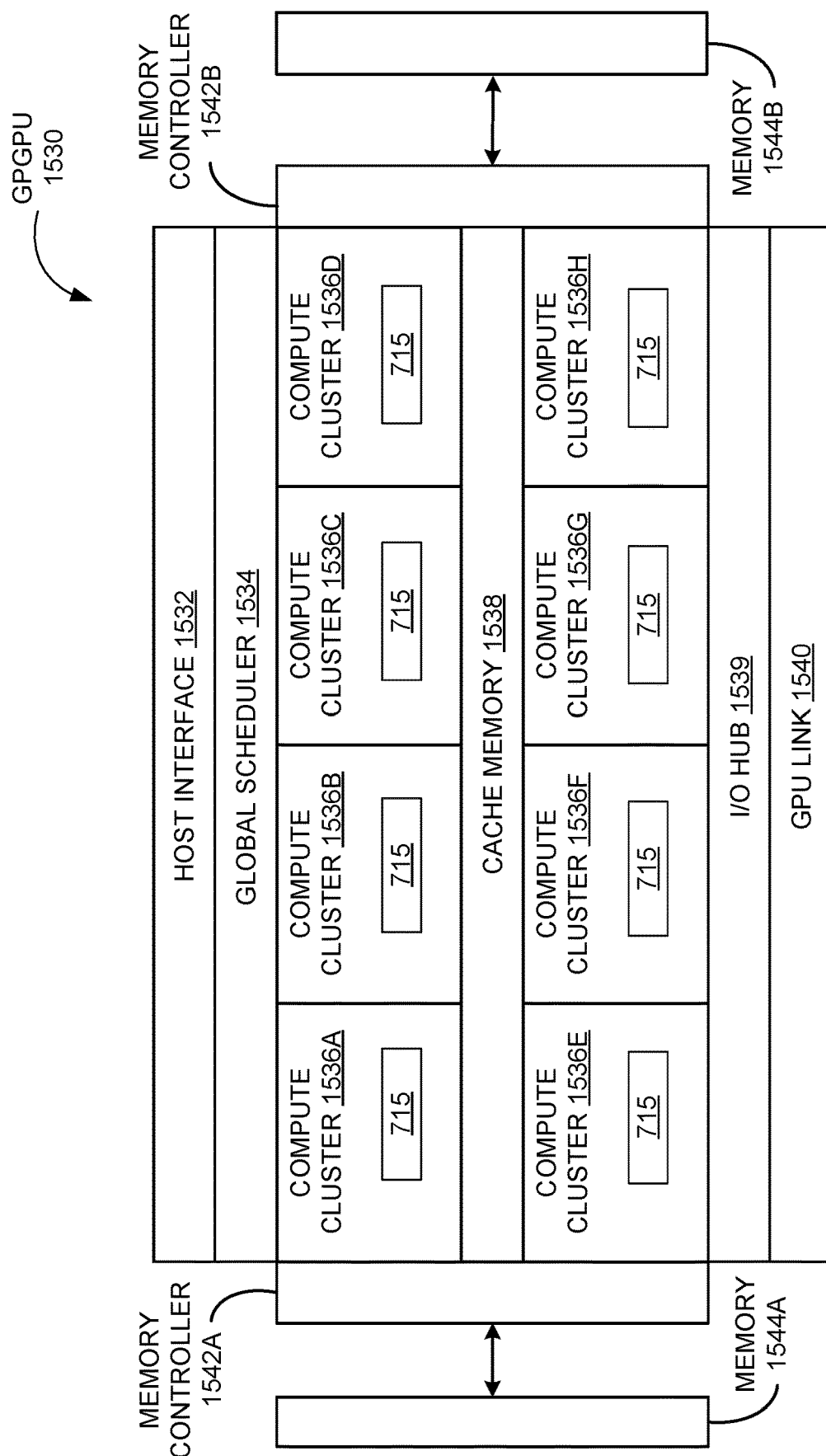

FIGS. 15A-15B illustrate additional exemplary graphics processor logic according to embodiments described herein. FIG. 15A illustrates a graphics core 1500 that may be included within graphics processor 1310 of FIG. 13, in at least one embodiment, and may be a unified shader core 1455A-1455N as in FIG. 14B in at least one embodiment. FIG. 15B illustrates a highly-parallel general-purpose graphics processing unit ("GPGPU") 1530 suitable for deployment on a multi-chip module in at least one embodiment.

In at least one embodiment, graphics core 1500 includes a shared instruction cache 1502, a texture unit 1518, and a cache/shared memory 1520 (e.g., including L1, L2, L3, last level cache, or other caches) that are common to execution resources within graphics core 1500. In at least one embodiment, graphics core 1500 can include multiple slices 1501A-1501N or a partition for each core, and a graphics processor can include multiple instances of graphics core 1500. In at least one embodiment, each slice 1501A-1501N refers to graphics core 1500. In at least one embodiment, slices 1501A-1501N have sub-slices, which are part of a slice 1501A-1501N. In at least one embodiment, slices 1501A-1501N are independent of other slices or dependent on other slices. In at least one embodiment, slices 1501A-1501N can include support logic including a local instruction cache 1504A-1504N, a thread scheduler (sequencer) 1506A-1506N, a thread dispatcher 1508A-1508N, and a set of registers 1510A-1510N. In at least one embodiment, slices 1501A-1501N can include a set of additional function units (AFUs 1512A-1512N), floating-point units (FPUs 1514A-1514N), integer arithmetic logic units (ALUs 1516A-1516N), address computational units (ACUs 1513A-1513N), double-precision floating-point units (DPFPUs 1515A-1515N), and matrix processing units (MPUs 1517A-1517N).

In at least one embodiment, each slice 1501A-1501N includes one or more engines for floating point and integer vector operations and one or more engines to accelerate convolution and matrix operations in AI, machine learning, or large dataset workloads. In at least one embodiment, one or more slices 1501A-1501N include one or more vector engines to compute a vector (e.g., compute mathematical operations for vectors). In at least one embodiment, a vector engine can compute a vector operation in 16-bit floating point (also referred to as "FP16"), 32-bit floating point (also referred to as "FP32"), or 64-bit floating point (also referred to as "FP64"). In at least one embodiment, one or more slices 1501A-1501N includes 16 vector engines that are paired with 16 matrix math units to compute matrix/tensor operations, where vector engines and math units are exposed via matrix extensions. In at least one embodiment, a slice a specified portion of processing resources of a processing unit, e.g., 16 cores and a ray tracing unit or 8 cores, a thread scheduler, a thread dispatcher, and additional functional units for a processor. In at least one embodiment, graphics core 1500 includes one or more matrix engines to compute matrix operations, e.g., when computing tensor operations.

In at least one embodiment, one or more slices 1501A-1501N includes one or more ray tracing units to compute ray tracing operations (e.g., 16 ray tracing units per slice slices 1501A-1501N). In at least one embodiment, a ray tracing unit computes ray traversal, triangle intersection, bounding box intersect, or other ray tracing operations.

In at least one embodiment, one or more slices 1501A-1501N includes a media slice that encodes, decodes, and/or transcodes data; scales and/or format converts data; and/or performs video quality operations on video data.

In at least one embodiment, one or more slices 1501A-1501N are linked to L2 cache and memory fabric, link connectors, high-bandwidth memory (HBM) (e.g., HBM2e, HDM3) stacks, and a media engine. In at least one embodiment, one or more slices 1501A-1501N include multiple cores (e.g., 16 cores) and multiple ray tracing units (e.g., 16) paired to each core. In at least one embodiment, one or more slices 1501A-1501N has one or more L1 caches. In at least one embodiment, one or more slices 1501A-1501N include one or more vector engines; one or more instruction caches to store instructions; one or more L1 caches to cache data; one or more shared local memories (SLMs) to store data, e.g., corresponding to instructions; one or more samplers to sample data; one or more ray tracing units to perform ray tracing operations; one or more geometries to perform operations in geometry pipelines and/or apply geometric transformations to vertices or polygons; one or more rasterizers to describe an image in vector graphics format (e.g., shape) and convert it into a raster image (e.g., a series of pixels, dots, or lines, which when displayed together, create an image that is represented by shapes); one or more a Hierarchical Depth Buffer (Hiz) to buffer data; and/or one or more pixel backends. In at least one embodiment, a slice 1501A-1501N includes a memory fabric, e.g., an L2 cache.

In at least one embodiment, FPUs 1514A-1514N can perform single-precision (32-bit) and half-precision (16-bit) floating point operations, while DPFPUs 1515A-1515N perform double precision (64-bit) floating point operations. In at least one embodiment, ALUs 1516A-1516N can perform variable precision integer operations at 8-bit, 16-bit, and 32-bit precision, and can be configured for mixed precision operations. In at least one embodiment, MPUs 1517A-1517N can also be configured for mixed precision matrix operations, including half-precision floating point and 8-bit integer operations. In at least one embodiment, MPUs 1517-1517N can perform a variety of matrix operations to accelerate machine learning application frameworks, including enabling support for accelerated general matrix to matrix multiplication (GEMM). In at least one embodiment, AFUs 1512A-1512N can perform additional logic operations not supported by floating-point or integer units, including trigonometric operations (e.g., sine, cosiInference and/or training logic 115 are used to perform inferencing and/or training operations associated with one or more embodiments. In at least one embodiment, inference and/or training logic 115 may be used in graphics core 1500 for inferencing or predicting operations based, at least in part, on weight parameters calculated using neural network training operations, neural network functions and/or architectures, or neural network use cases described herein.

In at least one embodiment, graphics core 1500 includes an interconnect and a link fabric sublayer that is attached to a switch and a GPU-GPU bridge that enables multiple graphics processors 1500 (e.g., 8) to be interlinked without glue to each other with load/store units (LSUs), data transfer units, and sync semantics across multiple graphics processors 1500. In at least one embodiment, interconnects include standardized interconnects (e.g., PCIe) or some combination thereof.

In at least one embodiment, graphics core 1500 includes multiple tiles. In at least one embodiment, a tile is an individual die or one or more dies, where individual dies can be connected with an interconnect (e.g., embedded multi-die interconnect bridge (EMIB)). In at least one embodiment, graphics core 1500 includes a compute tile, a memory tile (e.g., where a memory tile can be exclusively accessed by different tiles or different chipsets such as a Rambo tile), substrate tile, a base tile, a HMB tile, a link tile, and EMIB tile, where all tiles are packaged together in graphics core 1500 as part of a GPU. In at least one embodiment, graphics core 1500 can include multiple tiles in a single package (also referred to as a "multi tile package"). In at least one embodiment, a compute tile can have 8 graphics cores 1500, an L1 cache; and a base tile can have a host interface with PCIe 5.0, HBM2e, MDFI, and EMIB, a link tile with 8 links, 8 ports with an embedded switch. In at least one embodiment, tiles are connected with face-to-face (F2F) chip-on-chip bonding through fine-pitched, 36-micron, microbumps (e.g., copper pillars). In at least one embodiment, graphics core 1500 includes memory fabric, which includes memory, and is tile that is accessible by multiple tiles. In at least one embodiment, graphics core 1500 stores, accesses, or loads its own hardware contexts in memory, where a hardware context is a set of data loaded from registers before a process resumes, and where a hardware context can indicate a state of hardware (e.g., state of a GPU).

In at least one embodiment, graphics core 1500 includes serializer/deserializer (SERDES) circuitry that converts a serial data stream to a parallel data stream, or converts a parallel data stream to a serial data stream.

In at least one embodiment, graphics core 1500 includes a high speed coherent unified fabric (GPU to GPU), load/store units, bulk data transfer and sync semantics, and connected GPUs through an embedded switch, where a GPU-GPU bridge is controlled by a controller.

In at least one embodiment, graphics core 1500 performs an API, where said API abstracts hardware of graphics core 1500 and access libraries with instructions to perform math operations (e.g., math kernel library), deep neural network operations (e.g., deep neural network library), vector operations, collective communications, thread building blocks, video processing, data analytics library, and/or ray tracing operations.

Embodiments presented herein can generate training communications using multiple types of content that can be used to train and fine tune threat detection models for various categories of recipients.

FIG. 15B illustrates a general-purpose processing unit (GPGPU) 1530 that can be configured to enable highly-parallel compute operations to be performed by an array of graphics processing units, in at least one embodiment. In at least one embodiment, GPGPU 1530 can be linked directly to other instances of GPGPU 1530 to create a multi-GPU cluster to improve training speed for deep neural networks. In at least one embodiment, GPGPU 1530 includes a host interface 1532 to enable a connection with a host processor. In at least one embodiment, host interface 1532 is a PCI Express interface. In at least one embodiment, host interface 1532 can be a vendor-specific communications interface or communications fabric. In at least one embodiment, GPGPU 1530 receives commands from a host processor and uses a global scheduler 1534 (which may be referred to as a thread sequencer and/or asynchronous compute engine) to distribute execution threads associated with those commands to a set of compute clusters 1536A-1536H. In at least one embodiment, compute clusters 1536A-1536H share a cache memory 1538. In at least one embodiment, cache memory 1538 can serve as a higher-level cache for cache memories within compute clusters 1536A-1536H.

In at least one embodiment, GPGPU 1530 includes memory 1544A-1544B coupled with compute clusters 1536A-1536H via a set of memory controllers 1542A-1542B (e.g., one or more memory controllers for HBM2e). In at least one embodiment, memory 1544A-1544B can include various types of memory devices including dynamic random access memory (DRAM) or graphics random access memory, such as synchronous graphics random access memory (SGRAM), including graphics double data rate (GDDR) memory.

In at least one embodiment, compute clusters 1536A-1536H each include a set of graphics cores, such as graphics core 1500 of FIG. 15A, which can include multiple types of integer and floating point logic units that can perform computational operations at a range of precisions including suited for machine learning computations. For example, in at least one embodiment, at least a subset of floating point units in each of compute clusters 1536A-1536H can be configured to perform 16-bit or 32-bit floating point operations, while a different subset of floating point units can be configured to perform 64-bit floating point operations.

In at least one embodiment, multiple instances of GPGPU 1530 can be configured to operate as a compute cluster. In at least one embodiment, communication used by compute clusters 1536A-1536H for synchronization and data exchange varies across embodiments. In at least one embodiment, multiple instances of GPGPU 1530 communicate over host interface 1532. In at least one embodiment, GPGPU 1530 includes an I/O hub 1539 that couples GPGPU 1530 with a GPU link 1540 that enables a direct connection to other instances of GPGPU 1530. In at least one embodiment, GPU link 1540 is coupled to a dedicated GPU-to-GPU bridge that enables communication and synchronization between multiple instances of GPGPU 1530. In at least one embodiment, GPU link 1540 couples with a high-speed interconnect to transmit and receive data to other GPGPUs or parallel processors. In at least one embodiment, multiple instances of GPGPU 1530 are located in separate data processing systems and communicate via a network device that is accessible via host interface 1532. In at least one embodiment GPU link 1540 can be configured to enable a connection to a host processor in addition to or as an alternative to host interface 1532.

In at least one embodiment, GPGPU 1530 can be configured to train neural networks. In at least one embodiment, GPGPU 1530 can be used within an inferencing platform. In at least one embodiment, in which GPGPU 1530 is used for inferencing, GPGPU 1530 may include fewer compute clusters 1536A-1536H relative to when GPGPU 1530 is used for training a neural network. In at least one embodiment, memory technology associated with memory 1544A-1544B may differ between inferencing and training configurations, with higher bandwidth memory technologies devoted to training configurations. In at least one embodiment, an inferencing configuration of GPGPU 1530 can support inferencing specific instructions. For example, in at least one embodiment, an inferencing configuration can provide support for one or more 8-bit integer dot product instructions, which may be used during inferencing operations for deployed neural networks.

Inference and/or training logic 115 are used to perform inferencing and/or training operations associated with one or more embodiments. In at least one embodiment, inference and/or training logic 115 may be used in GPGPU 1530 for inferencing or predicting operations based, at least in part, on weight parameters calculated using neural network training operations, neural network functions and/or architectures, or neural network use cases described herein. Embodiments presented herein can generate training communications using multiple types of content that can be used to train and fine tune threat detection models for various categories of recipients.

Figure 16:
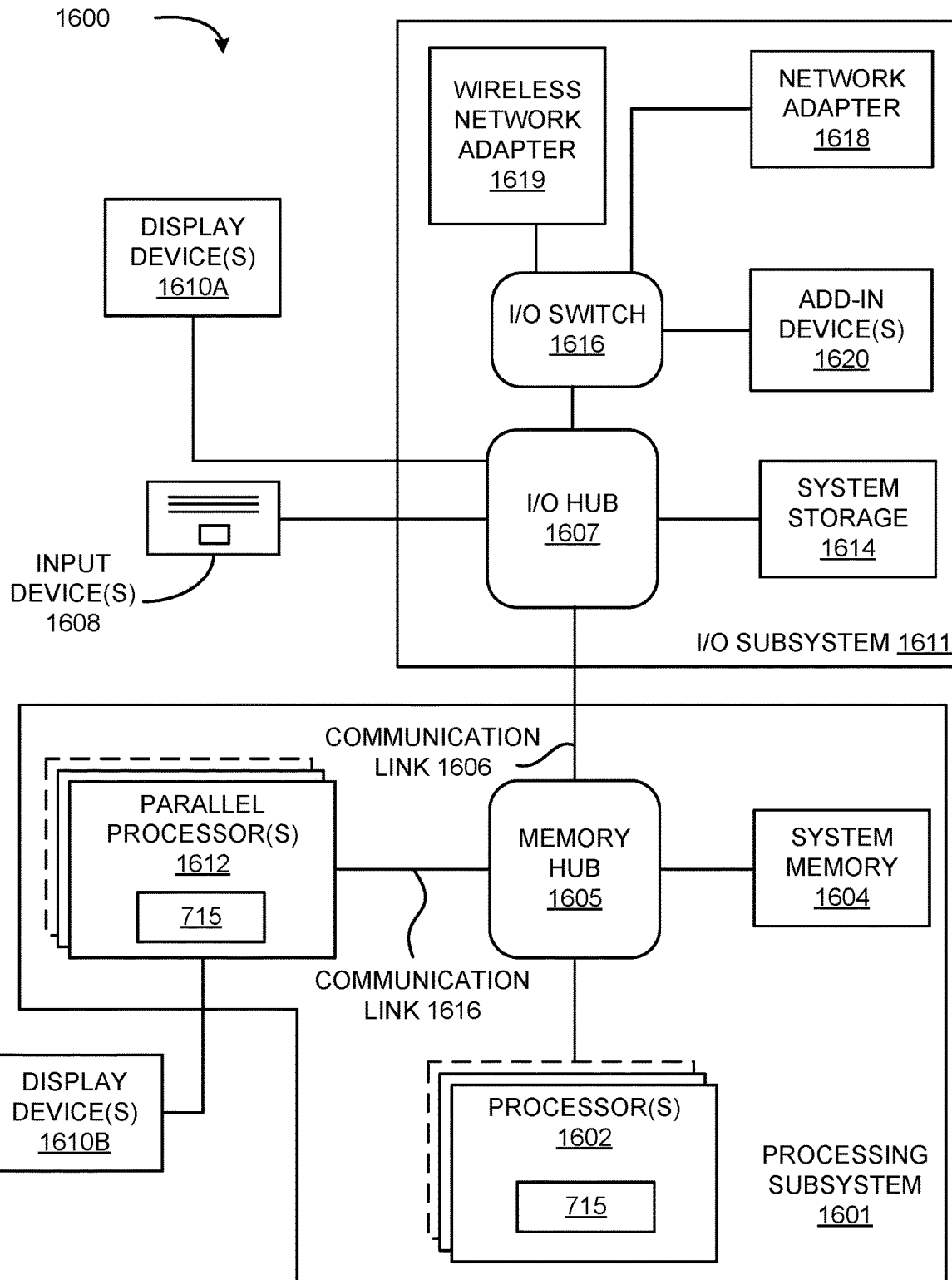
FIG. 16 illustrates a computer system, according to at least one embodiment.

FIG. 16 is a block diagram illustrating a computing system 1600 according to at least one embodiment. In at least one embodiment, computing system 1600 includes a processing subsystem 1601 having one or more processor(s) 1602 and a system memory 1604 communicating via an interconnection path that may include a memory hub 1605. In at least one embodiment, memory hub 1605 may be a separate component within a chipset component or may be integrated within one or more processor(s) 1602. In at least one embodiment, memory hub 1605 couples with an I/O subsystem 1611 via a communication link 1606. In at least one embodiment, I/O subsystem 1611 includes an I/O hub 1607 that can enable computing system 1600 to receive input from one or more input device(s) 1608. In at least one embodiment, I/O hub 1607 can enable a display controller, which may be included in one or more processor(s) 1602, to provide outputs to one or more display device(s) 1610A. In at least one embodiment, one or more display device(s) 1610A coupled with I/O hub 1607 can include a local, internal, or embedded display device.

In at least one embodiment, processing subsystem 1601 includes one or more parallel processor(s) 1612 coupled to memory hub 1605 via a bus or other communication link 1613. In at least one embodiment, communication link 1613 may use one of any number of standards based communication link technologies or protocols, such as, but not limited to PCI Express, or may be a vendor-specific communications interface or communications fabric. In at least one embodiment, one or more parallel processor(s) 1612 form a computationally focused parallel or vector processing system that can include a large number of processing cores and/or processing clusters, such as a many-integrated core (MIC) processor. In at least one embodiment, some or all of parallel processor(s) 1612 form a graphics processing subsystem that can output pixels to one of one or more display device(s) 1610A coupled via I/O Hub 1607. In at least one embodiment, parallel processor(s) 1612 can also include a display controller and display interface (not shown) to enable a direct connection to one or more display device(s) 1610B. In at least one embodiment, parallel processor(s) 1612 include one or more cores, such as graphics cores 1500 discussed herein.

In at least one embodiment, a system storage unit 1614 can connect to I/O hub 1607 to provide a storage mechanism for computing system 1600. In at least one embodiment, an I/O switch 1616 can be used to provide an interface mechanism to enable connections between I/O hub 1607 and other components, such as a network adapter 1618 and/or a wireless network adapter 1619 that may be integrated into platform, and various other devices that can be added via one or more add-in device(s) 1620. In at least one embodiment, network adapter 1618 can be an Ethernet adapter or another wired network adapter. In at least one embodiment, wireless network adapter 1619 can include one or more of a Wi-Fi, Bluetooth, near field communication (NFC), or other network device that includes one or more wireless radios.

In at least one embodiment, computing system 1600 can include other components not explicitly shown, including USB or other port connections, optical storage drives, video capture devices, and like, may also be connected to I/O hub 1607. In at least one embodiment, communication paths interconnecting various components in FIG. 16 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1612 incorporate circuitry optimized for graphics and video processing, including, for example, video output circuitry, and constitutes a graphics processing unit (GPU), e.g., parallel processor(s) 1612 includes graphics core 1500. In at least one embodiment, parallel processor(s) 1612 incorporate circuitry optimized for general purpose processing. In at least embodiment, components of computing system 1600 may be integrated with one or more other system elements on a single integrated circuit. For example, in at least one embodiment, parallel processor(s) 1612, memory hub 1605, processor(s) 1602, and I/O hub 1607 can be integrated into a system on chip (SoC) integrated circuit. In at least one embodiment, components of computing system 1600 can be integrated into a single package to form a system in package (SIP) configuration. In at least one embodiment, at least a portion of components of computing system 1600 can be integrated into a multi-chip module (MCM), which can be interconnected with other multi-chip modules into a modular computing system.

Inference and/or training logic 115 are used to perform inferencing and/or training operations associated with one or more embodiments. In at least one embodiment, inference and/or training logic 115 may be used in system FIG. 1600 for inferencing or predicting operations based, at least in part, on weight parameters calculated using neural network training operations, neural network functions and/or architectures, or neural network use cases described herein. Embodiments presented herein can generate training communications using multiple types of content that can be used to train and fine tune threat detection models for various categories of recipients.

Processors

Figure 17A:
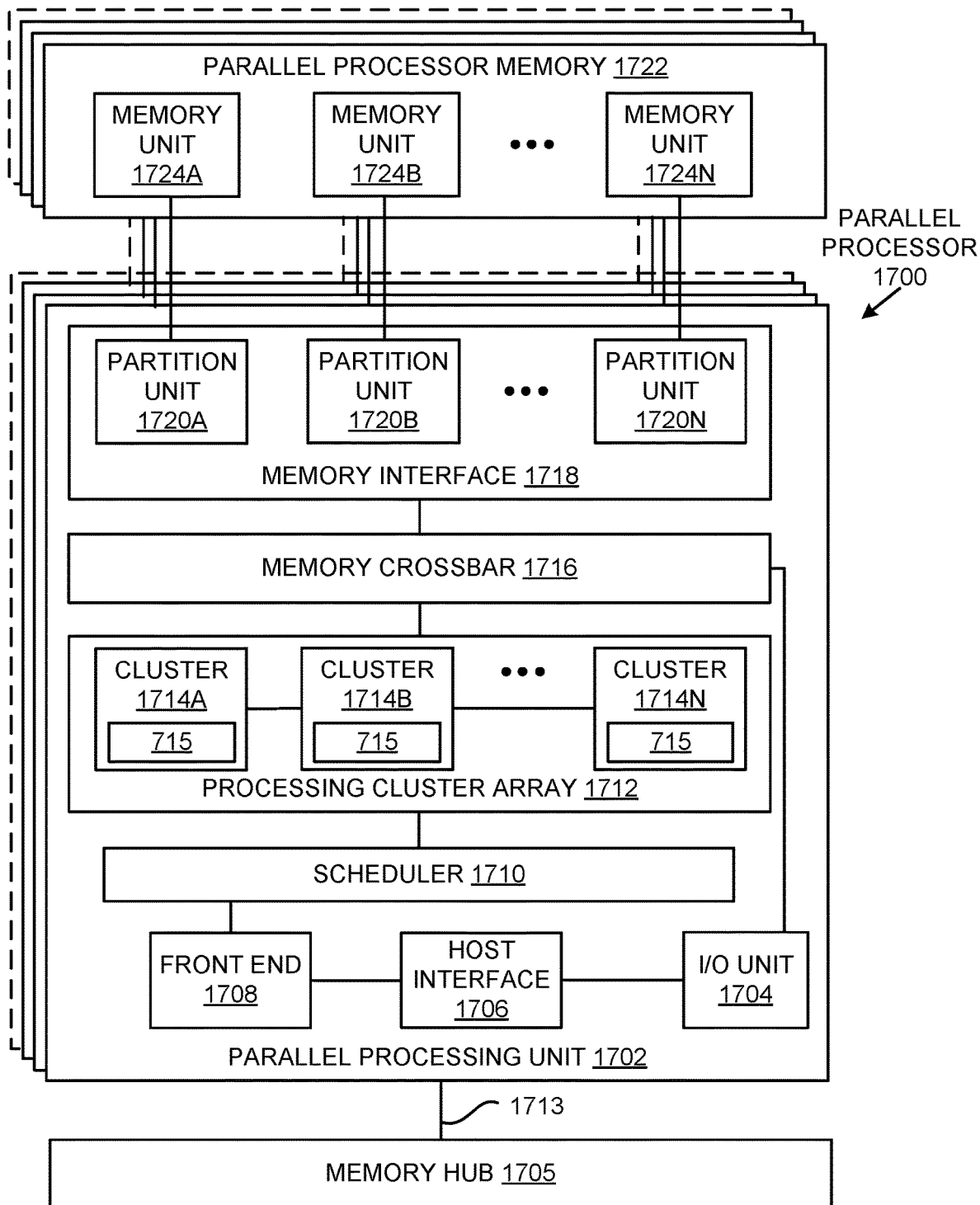
FIG. 17A illustrates a parallel processor, according to at least one embodiment.

FIG. 17A illustrates a parallel processor 1700 according to at least one embodiment. In at least one embodiment, various components of parallel processor 1700 may be implemented using one or more integrated circuit devices, such as programmable processors, application specific integrated circuits (ASICs), or field programmable gate arrays (FPGA). In at least one embodiment, illustrated parallel processor 1700 is a variant of one or more parallel processor(s) 1612 shown in FIG. 16 according to an exemplary embodiment. In at least one embodiment, a parallel processor 1700 includes one or more graphics cores 1500.

In at least one embodiment, parallel processor 1700 includes a parallel processing unit 1702. In at least one embodiment, parallel processing unit 1702 includes an I/O unit 1704 that enables communication with other devices, including other instances of parallel processing unit 1702. In at least one embodiment, I/O unit 1704 may be directly connected to other devices. In at least one embodiment, I/O unit 1704 connects with other devices via use of a hub or switch interface, such as a memory hub 1705. In at least one embodiment, connections between memory hub 1705 and I/O unit 1704 form a communication link 1713. In at least one embodiment, I/O unit 1704 connects with a host interface 1706 and a memory crossbar 1716, where host interface 1706 receives commands directed to performing processing operations and memory crossbar 1716 receives commands directed to performing memory operations.

In at least one embodiment, when host interface 1706 receives a command buffer via I/O unit 1704, host interface 1706 can direct work operations to perform those commands to a front end 1708. In at least one embodiment, front end 1708 couples with a scheduler 1710 (which may be referred to as a sequencer), which is configured to distribute commands or other work items to a processing cluster array 1712. In at least one embodiment, scheduler 1710 ensures that processing cluster array 1712 is properly configured and in a valid state before tasks are distributed to a cluster of processing cluster array 1712. In at least one embodiment, scheduler 1710 is implemented via firmware logic executing on a microcontroller. In at least one embodiment, microcontroller implemented scheduler 1710 is configurable to perform complex scheduling and work distribution operations at coarse and fine granularity, enabling rapid preemption and context switching of threads executing on processing array 1712. In at least one embodiment, host software can prove workloads for scheduling on processing cluster array 1712 via one of multiple graphics processing paths. In at least one embodiment, workloads can then be automatically distributed across processing array cluster 1712 by scheduler 1710 logic within a microcontroller including scheduler 1710.

In at least one embodiment, processing cluster array 1712 can include up to "N" processing clusters (e.g., cluster 1714A, cluster 1714B, through cluster 1714N), where "N" represents a positive integer (which may be a different integer "N" than used in other figures). In at least one embodiment, each cluster 1714A-1714N of processing cluster array 1712 can execute a large number of concurrent threads. In at least one embodiment, scheduler 1710 can allocate work to clusters 1714A-1714N of processing cluster array 1712 using various scheduling and/or work distribution algorithms, which may vary depending on workload arising for each type of program or computation. In at least one embodiment, scheduling can be handled dynamically by scheduler 1710, or can be assisted in part by compiler logic during compilation of program logic configured for execution by processing cluster array 1712. In at least one embodiment, different clusters 1714A-1714N of processing cluster array 1712 can be allocated for processing different types of programs or for performing different types of computations.

In at least one embodiment, processing cluster array 1712 can be configured to perform various types of parallel processing operations. In at least one embodiment, processing cluster array 1712 is configured to perform general-purpose parallel compute operations. For example, in at least one embodiment, processing cluster array 1712 can include logic to execute processing tasks including filtering of video and/or audio data, performing modeling operations, including physics operations, and performing data transformations.

In at least one embodiment, processing cluster array 1712 is configured to perform parallel graphics processing operations. In at least one embodiment, processing cluster array 1712 can include additional logic to support execution of such graphics processing operations, including but not limited to, texture sampling logic to perform texture operations, as well as tessellation logic and other vertex processing logic. In at least one embodiment, processing cluster array 1712 can be configured to execute graphics processing related shader programs such as, but not limited to, vertex shaders, tessellation shaders, geometry shaders, and pixel shaders. In at least one embodiment, parallel processing unit 1702 can transfer data from system memory via I/O unit 1704 for processing. In at least one embodiment, during processing, transferred data can be stored to on-chip memory (e.g., parallel processor memory 1722) during processing, then written back to system memory.

In at least one embodiment, when parallel processing unit 1702 is used to perform graphics processing, scheduler 1710 can be configured to divide a processing workload into approximately equal sized tasks, to better enable distribution of graphics processing operations to multiple clusters 1714A-1714N of processing cluster array 1712. In at least one embodiment, portions of processing cluster array 1712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1714A-1714N may be stored in buffers to allow intermediate data to be transmitted between clusters 1714A-1714N for further processing.

In at least one embodiment, processing cluster array 1712 can receive processing tasks to be executed via scheduler 1710, which receives commands defining processing tasks from front end 1708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1710 may be configured to fetch indices corresponding to tasks or may receive indices from front end 1708. In at least one embodiment, front end 1708 can be configured to ensure processing cluster array 1712 is configured to a valid state before a workload specified by incoming command buffers (e.g., batch-buffers, push buffers, etc.) is initiated.

In at least one embodiment, each of one or more instances of parallel processing unit 1702 can couple with a parallel processor memory 1722. In at least one embodiment, parallel processor memory 1722 can be accessed via memory crossbar 1716, which can receive memory requests from processing cluster array 1712 as well as I/O unit 1704. In at least one embodiment, memory crossbar 1716 can access parallel processor memory 1722 via a memory interface 1718. In at least one embodiment, memory interface 1718 can include multiple partition units (e.g., partition unit 1720A, partition unit 1720B, through partition unit 1720N) that can each couple to a portion (e.g., memory unit) of parallel processor memory 1722. In at least one embodiment, a number of partition units 1720A-1720N is configured to be equal to a number of memory units, such that a first partition unit 1720A has a corresponding first memory unit 1724A, a second partition unit 1720B has a corresponding memory unit 1724B, and an N-th partition unit 1720N has a corresponding N-th memory unit 1724N. In at least one embodiment, a number of partition units 1720A-1720N may not be equal to a number of memory units.

In at least one embodiment, memory units 1724A-1724N can include various types of memory devices, including dynamic random access memory (DRAM) or graphics random access memory, such as synchronous graphics random access memory (SGRAM), including graphics double data rate (GDDR) memory. In at least one embodiment, memory units 1724A-1724N may also include 3D stacked memory, including but not limited to high bandwidth memory (HBM), HBM2e, or HDM3. In at least one embodiment, render targets, such as frame buffers or texture maps may be stored across memory units 1724A-1724N, allowing partition units 1720A-1720N to write portions of each render target in parallel to efficiently use available bandwidth of parallel processor memory 1722. In at least one embodiment, a local instance of parallel processor memory 1722 may be excluded in favor of a unified memory design that utilizes system memory in conjunction with local cache memory.

In at least one embodiment, any one of clusters 1714A-1714N of processing cluster array 1712 can process data that will be written to any of memory units 1724A-1724N within parallel processor memory 1722. In at least one embodiment, memory crossbar 1716 can be configured to transfer an output of each cluster 1714A-1714N to any partition unit 1720A-1720N or to another cluster 1714A-1714N, which can perform additional processing operations on an output. In at least one embodiment, each cluster 1714A-1714N can communicate with memory interface 1718 through memory crossbar 1716 to read from or write to various external memory devices. In at least one embodiment, memory crossbar 1716 has a connection to memory interface 1718 to communicate with I/O unit 1704, as well as a connection to a local instance of parallel processor memory 1722, enabling processing units within different processing clusters 1714A-1714N to communicate with system memory or other memory that is not local to parallel processing unit 1702. In at least one embodiment, memory crossbar 1716 can use virtual channels to separate traffic streams between clusters 1714A-1714N and partition units 1720A-1720N.

In at least one embodiment, multiple instances of parallel processing unit 1702 can be provided on a single add-in card, or multiple add-in cards can be interconnected. In at least one embodiment, different instances of parallel processing unit 1702 can be configured to interoperate even if different instances have different numbers of processing cores, different amounts of local parallel processor memory, and/or other configuration differences. For example, in at least one embodiment, some instances of parallel processing unit 1702 can include higher precision floating point units relative to other instances. In at least one embodiment, systems incorporating one or more instances of parallel processing unit 1702 or parallel processor 1700 can be implemented in a variety of configurations and form factors, including but not limited to desktop, laptop, or handheld personal computers, servers, workstations, game consoles, and/or embedded systems.

Figure 17B:
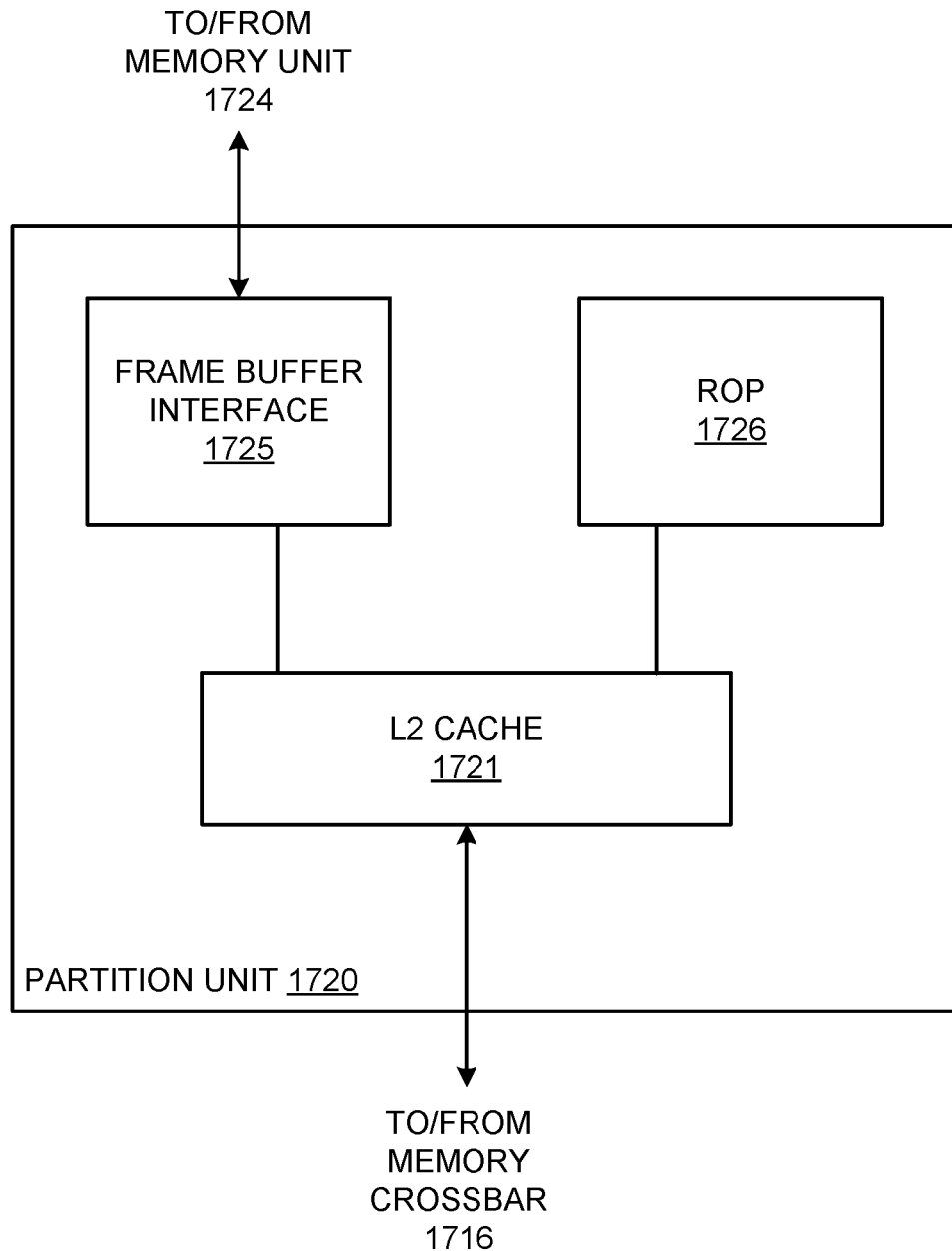
FIG. 17B illustrates a partition unit, according to at least one embodiment.

FIG. 17B is a block diagram of a partition unit 1720 according to at least one embodiment. In at least one embodiment, partition unit 1720 is an instance of one of partition units 1720A-1720N of FIG. 17A. In at least one embodiment, partition unit 1720 includes an L2 cache 1721, a frame buffer interface 1725, and a ROP 1726 (raster operations unit). In at least one embodiment, L2 cache 1721 is a read/write cache that is configured to perform load and store operations received from memory crossbar 1716 and ROP 1726. In at least one embodiment, read misses and urgent write-back requests are output by L2 cache 1721 to frame buffer interface 1725 for processing. In at least one embodiment, updates can also be sent to a frame buffer via frame buffer interface 1725 for processing. In at least one embodiment, frame buffer interface 1725 interfaces with one of memory units in parallel processor memory, such as memory units 1724A-1724N of FIG. 17A (e.g., within parallel processor memory 1722).

In at least one embodiment, ROP 1726 is a processing unit that performs raster operations such as stencil, z test, blending, etc. In at least one embodiment, ROP 1726 then outputs processed graphics data that is stored in graphics memory. In at least one embodiment, ROP 1726 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1726 can vary based on statistical characteristics of data to be compressed. For example, in at least one embodiment, delta color compression is performed on depth and color data on a per-tile basis.

In at least one embodiment, ROP 1726 is included within each processing cluster (e.g., cluster 1714A-1714N of FIG. 17A) instead of within partition unit 1720. In at least one embodiment, read and write requests for pixel data are transmitted over memory crossbar 1716 instead of pixel fragment data. In at least one embodiment, processed graphics data may be displayed on a display device, such as one of one or more display device(s) 1610 of FIG. 16, routed for further processing by processor(s) 1602, or routed for further processing by one of processing entities within parallel processor 1700 of FIG. 17A.

Figure 18:
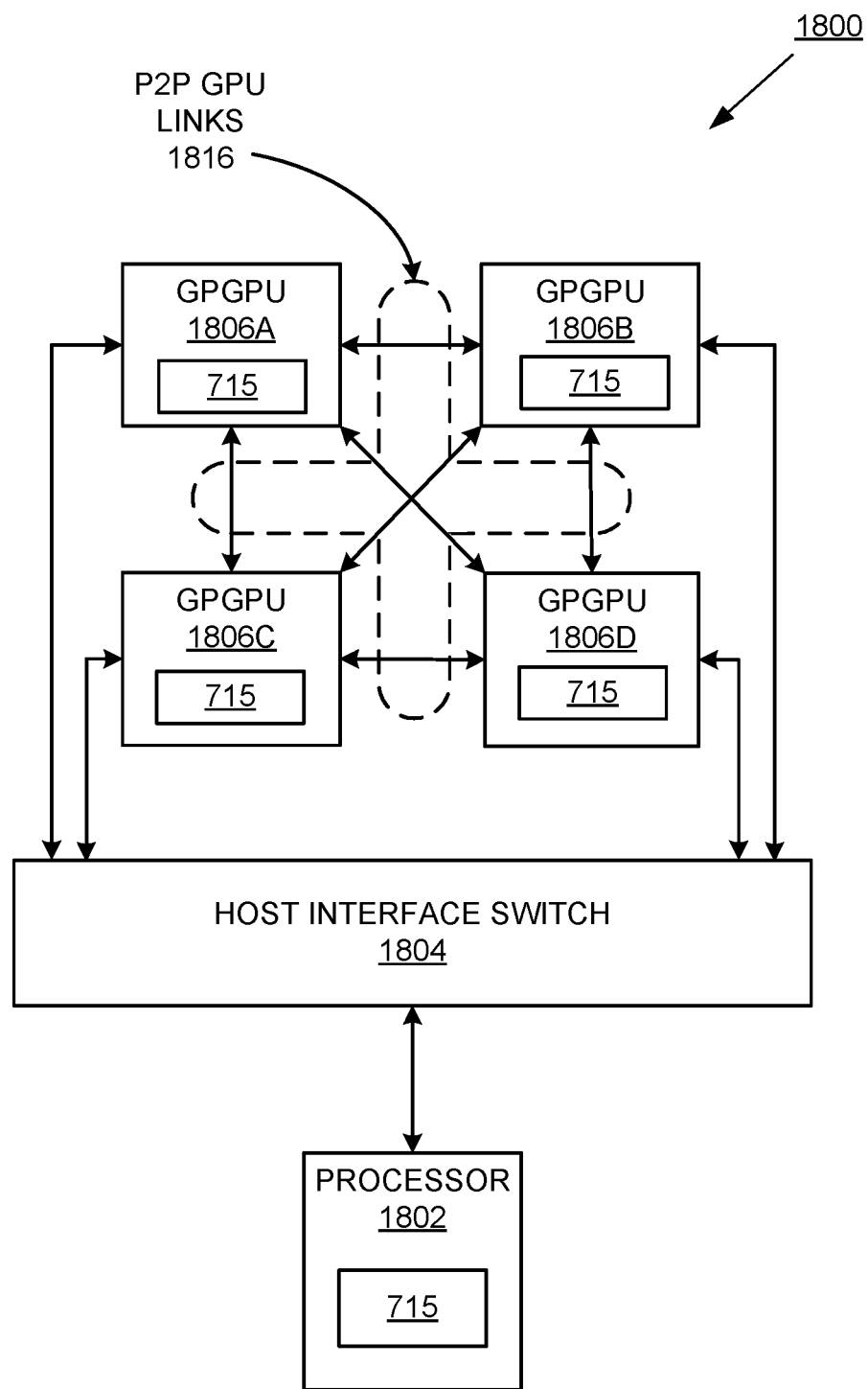
FIG. 18 illustrates a multi-graphics processing unit (GPU) system, according to at least one embodiment.

FIG. 18 illustrates a multi-GPU computing system 1800, according to at least one embodiment. In at least one embodiment, multi-GPU computing system 1800 can include a processor 1802 coupled to multiple general purpose graphics processing units (GPGPUs) 1806A-D via a host interface switch 1804. In at least one embodiment, host interface switch 1804 is a PCI express switch device that couples processor 1802 to a PCI express bus over which processor 1802 can communicate with GPGPUs 1806A-D. In at least one embodiment, GPGPUs 1806A-D can interconnect via a set of high-speed point-to-point GPU-to-GPU links 1816. In at least one embodiment, GPU-to-GPU links 1816 connect to each of GPGPUs 1806A-D via a dedicated GPU link. In at least one embodiment, P2P GPU links 1816 enable direct communication between each of GPGPUs 1806A-D without requiring communication over host interface bus 1804 to which processor 1802 is connected. In at least one embodiment, with GPU-to-GPU traffic directed to P2P GPU links 1816, host interface bus 1804 remains available for system memory access or to communicate with other instances of multi-GPU computing system 1800, for example, via one or more network devices. While in at least one embodiment GPGPUs 1806A-D connect to processor 1802 via host interface switch 1804, in at least one embodiment processor 1802 includes direct support for P2P GPU links 1816 and can connect directly to GPGPUs 1806A-D.

Inference and/or training logic 115 are used to perform inferencing and/or training operations associated with one or more embodiments. In at least one embodiment, inference and/or training logic 115 may be used in multi-GPU computing system 1800 for inferencing or predicting operations based, at least in part, on weight parameters calculated using neural network training operations, neural network functions and/or architectures, or neural network use cases described herein. In at least one embodiment, multi-GPU computing system 1800 includes one or more graphics cores 1500.

Embodiments presented herein can generate training communications using multiple types of content that can be used to train and fine tune threat detection models for various categories of recipients.

Figure 19:
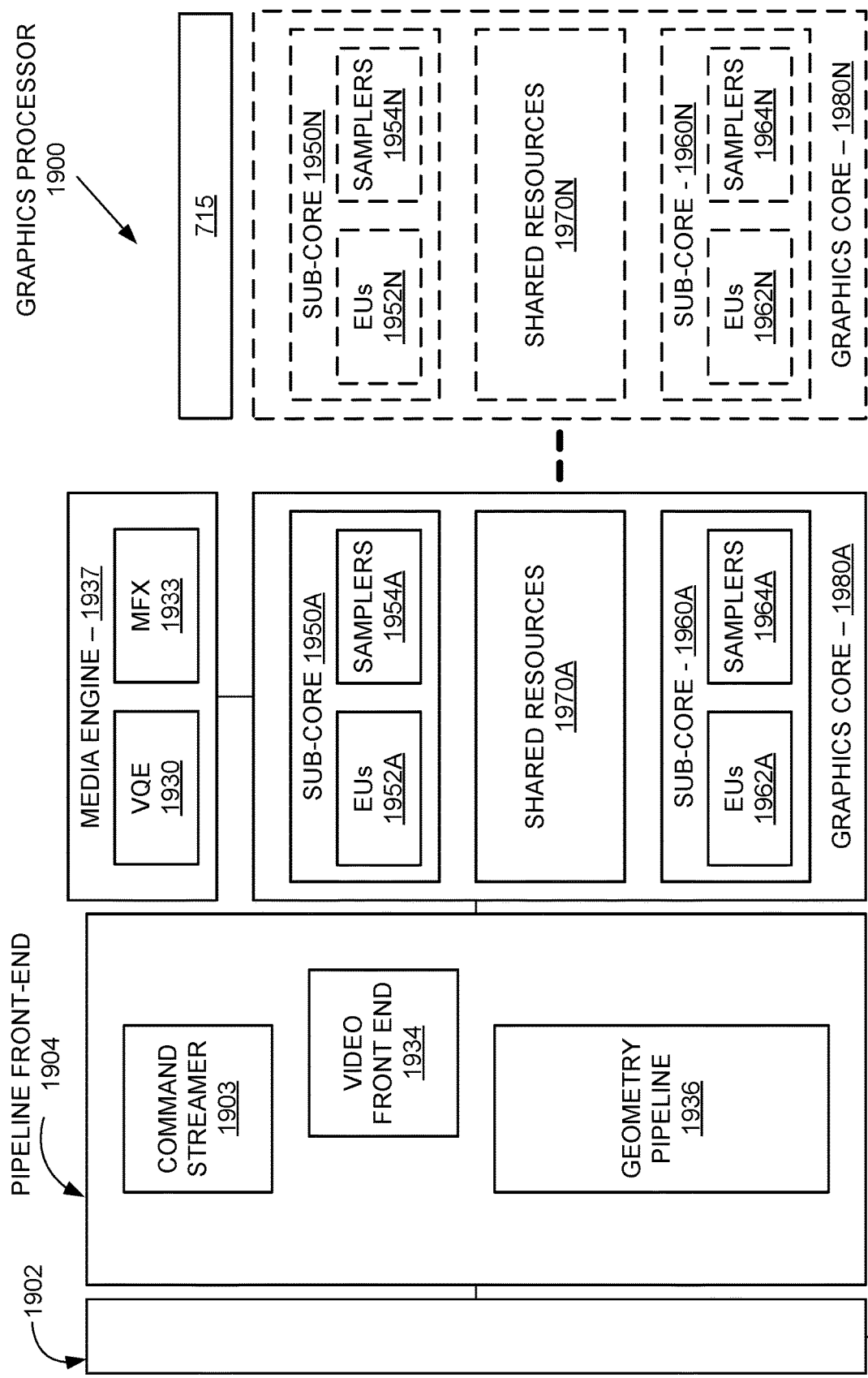
FIG. 19 illustrates a graphics processor, according to at least one embodiment.

FIG. 19 is a block diagram of a graphics processor 1900, according to at least one embodiment. In at least one embodiment, graphics processor 1900 includes a ring interconnect 1902, a pipeline front-end 1904, a media engine 1937, and graphics cores 1980A-1980N. In at least one embodiment, ring interconnect 1902 couples graphics processor 1900 to other processing units, including other graphics processors or one or more general-purpose processor cores. In at least one embodiment, graphics processor 1900 is one of many processors integrated within a multi-core processing system. In at least one embodiment, graphics processor 1900 includes graphics core 1500.

In at least one embodiment, graphics processor 1900 receives batches of commands via ring interconnect 1902. In at least one embodiment, incoming commands are interpreted by a command streamer 1903 in pipeline front-end 1904. In at least one embodiment, graphics processor 1900 includes scalable execution logic to perform 3D geometry processing and media processing via graphics core(s) 1980A-1980N. In at least one embodiment, for 3D geometry processing commands, command streamer 1903 supplies commands to geometry pipeline 1936. In at least one embodiment, for at least some media processing commands, command streamer 1903 supplies commands to a video front end 1934, which couples with media engine 1937. In at least one embodiment, media engine 1937 includes a Video Quality Engine (VQE) 1930 for video and image post-processing and a multi-format encode/decode (MFX) 1933 engine to provide hardware-accelerated media data encoding and decoding. In at least one embodiment, geometry pipeline 1936 and media engine 1937 each generate execution threads for thread execution resources provided by at least one graphics core 1980.

In at least one embodiment, graphics processor 1900 includes scalable thread execution resources featuring graphics cores 1980A-1980N (which can be modular and are sometimes referred to as core slices), each having multiple sub-cores 1950A-50N, 1960A-1960N (sometimes referred to as core sub-slices). In at least one embodiment, graphics processor 1900 can have any number of graphics cores 1980A. In at least one embodiment, graphics processor 1900 includes a graphics core 1980A having at least a first sub-core 1950A and a second sub-core 1960A. In at least one embodiment, graphics processor 1900 is a low power processor with a single sub-core (e.g., 1950A). In at least one embodiment, graphics processor 1900 includes multiple graphics cores 1980A-1980N, each including a set of first sub-cores 1950A-1950N and a set of second sub-cores 1960A-1960N. In at least one embodiment, each sub-core in first sub-cores 1950A-1950N includes at least a first set of execution units 1952A-1952N and media/texture samplers 1954A-1954N. In at least one embodiment, each sub-core in second sub-cores 1960A-1960N includes at least a second set of execution units 1962A-1962N and samplers 1964A-1964N. In at least one embodiment, each sub-core 1950A-1950N, 1960A-1960N shares a set of shared resources 1970A-1970N. In at least one embodiment, shared resources include shared cache memory and pixel operation logic. In at least one embodiment, graphics processor 1900 includes load/store units in pipeline front-end 1904.

Inference and/or training logic 115 are used to perform inferencing and/or training operations associated with one or more embodiments. In at least one embodiment, inference and/or training logic 115 may be used in graphics processor 1900 for inferencing or predicting operations based, at least in part, on weight parameters calculated using neural network training operations, neural network functions and/or architectures, or neural network use cases described herein.

Embodiments presented herein can generate training communications using multiple types of content that can be used to train and fine tune threat detection models for various categories of recipients.

Figure 20:
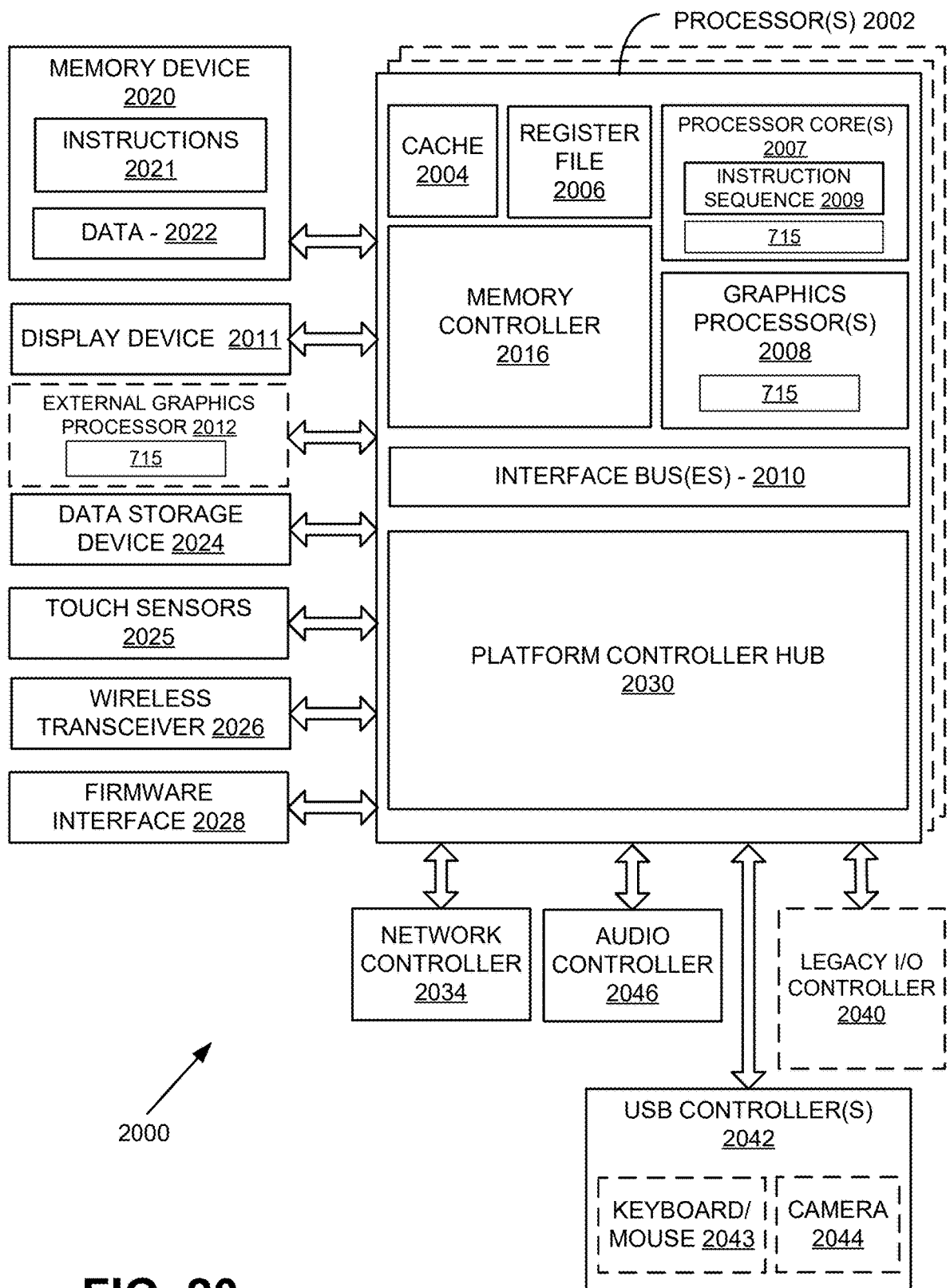
FIG. 20 illustrates at least portions of a graphics processor, according to one or more embodiments.

FIG. 20 is a block diagram of a processing system, according to at least one embodiment. In at least one embodiment, system 2000 includes one or more processors 2002 and one or more graphics processors 2008, and may be a single processor desktop system, a multiprocessor workstation system, or a server system having a large number of processors 2002 or processor cores 2007. In at least one embodiment, system 2000 is a processing platform incorporated within a system-on-a-chip (SoC) integrated circuit for use in mobile, handheld, or embedded devices. In at least one embodiment, one or more graphics processors 2008 include one or more graphics cores 1500.

In at least one embodiment, system 2000 can include, or be incorporated within a server-based gaming platform, a game console, including a game and media console, a mobile gaming console, a handheld game console, or an online game console. In at least one embodiment, system 2000 is a mobile phone, a smart phone, a tablet computing device or a mobile Internet device. In at least one embodiment, processing system 2000 can also include, couple with, or be integrated within a wearable device, such as a smart watch wearable device, a smart eyewear device, an augmented reality device, or a virtual reality device. In at least one embodiment, processing system 2000 is a television or set top box device having one or more processors 2002 and a graphical interface generated by one or more graphics processors 2008.

In at least one embodiment, one or more processors 2002 each include one or more processor cores 2007 to process instructions which, when executed, perform operations for system and user software. In at least one embodiment, each of one or more processor cores 2007 is configured to process a specific instruction sequence 2009. In at least one embodiment, instruction sequence 2009 may facilitate Complex Instruction Set Computing (CISC), Reduced Instruction Set Computing (RISC), or computing via a Very Long Instruction Word (VLIW). In at least one embodiment, processor cores 2007 may each process a different instruction sequence 2009, which may include instructions to facilitate emulation of other instruction sequences. In at least one embodiment, processor core 2007 may also include other processing devices, such a Digital Signal Processor (DSP).

In at least one embodiment, processor 2002 includes a cache memory 2004. In at least one embodiment, processor 2002 can have a single internal cache or multiple levels of internal cache. In at least one embodiment, cache memory is shared among various components of processor 2002. In at least one embodiment, processor 2002 also uses an external cache (e.g., a Level-3 (L3) cache or Last Level Cache (LLC)) (not shown), which may be shared among processor cores 2007 using known cache coherency techniques. In at least one embodiment, a register file 2006 is additionally included in processor 2002, which may include different types of registers for storing different types of data (e.g., integer registers, floating point registers, status registers, and an instruction pointer register). In at least one embodiment, register file 2006 may include general-purpose registers or other registers.

In at least one embodiment, one or more processor(s) 2002 are coupled with one or more interface bus(es) 2010 to transmit communication signals such as address, data, or control signals between processor 2002 and other components in system 2000. In at least one embodiment, interface bus 2010 can be a processor bus, such as a version of a Direct Media Interface (DMI) bus. In at least one embodiment, interface bus 2010 is not limited to a DMI bus, and may include one or more Peripheral Component Interconnect buses (e.g., PCI, PCI Express), memory busses, or other types of interface busses. In at least one embodiment processor(s) 2002 include an integrated memory controller 2016 and a platform controller hub 2030. In at least one embodiment, memory controller 2016 facilitates communication between a memory device and other components of system 2000, while platform controller hub (PCH) 2030 provides connections to I/O devices via a local I/O bus.

In at least one embodiment, a memory device 2020 can be a dynamic random access memory (DRAM) device, a static random access memory (SRAM) device, flash memory device, phase-change memory device, or some other memory device having suitable performance to serve as process memory. In at least one embodiment, memory device 2020 can operate as system memory for system 2000, to store data 2022 and instructions 2021 for use when one or more processors 2002 executes an application or process. In at least one embodiment, memory controller 2016 also couples with an optional external graphics processor 2012, which may communicate with one or more graphics processors 2008 in processors 2002 to perform graphics and media operations. In at least one embodiment, a display device 2011 can connect to processor(s) 2002. In at least one embodiment, display device 2011 can include one or more of an internal display device, as in a mobile electronic device or a laptop device, or an external display device attached via a display interface (e.g., DisplayPort, etc.). In at least one embodiment, display device 2011 can include a head mounted display (HMD) such as a stereoscopic display device for use in virtual reality (VR) applications or augmented reality (AR) applications.

In at least one embodiment, platform controller hub 2030 enables peripherals to connect to memory device 2020 and processor 2002 via a high-speed I/O bus. In at least one embodiment, I/O peripherals include, but are not limited to, an audio controller 2046, a network controller 2034, a firmware interface 2028, a wireless transceiver 2026, touch sensors 2025, a data storage device 2024 (e.g., hard disk drive, flash memory, etc.). In at least one embodiment, data storage device 2024 can connect via a storage interface (e.g., SATA) or via a peripheral bus, such as a Peripheral Component Interconnect bus (e.g., PCI, PCI Express). In at least one embodiment, touch sensors 2025 can include touch screen sensors, pressure sensors, or fingerprint sensors. In at least one embodiment, wireless transceiver 2026 can be a Wi-Fi transceiver, a Bluetooth transceiver, or a mobile network transceiver such as a 3G, 4G, or Long Term Evolution (LTE) transceiver. In at least one embodiment, firmware interface 2028 enables communication with system firmware, and can be, for example, a unified extensible firmware interface (UEFI). In at least one embodiment, network controller 2034 can enable a network connection to a wired network. In at least one embodiment, a high-performance network controller (not shown) couples with interface bus 2010. In at least one embodiment, audio controller 2046 is a multi-channel high definition audio controller. In at least one embodiment, system 2000 includes an optional legacy I/O controller 2040 for coupling legacy (e.g., Personal System 2 (PS/2)) devices to system 2000. In at least one embodiment, platform controller hub 2030 can also connect to one or more Universal Serial Bus (USB) controllers 2042 connect input devices, such as keyboard and mouse 2043 combinations, a camera 2044, or other USB input devices.

In at least one embodiment, an instance of memory controller 2016 and platform controller hub 2030 may be integrated into a discreet external graphics processor, such as external graphics processor 2012. In at least one embodiment, platform controller hub 2030 and/or memory controller 2016 may be external to one or more processor(s) 2002. For example, in at least one embodiment, system 2000 can include an external memory controller 2016 and platform controller hub 2030, which may be configured as a memory controller hub and peripheral controller hub within a system chipset that is in communication with processor(s) 2002.

Inference and/or training logic 715 are used to perform inferencing and/or training operations associated with one or more embodiments. In at least one embodiment portions or all of inference and/or training logic 715 may be incorporated into graphics processor 2008. For example, in at least one embodiment, training and/or inferencing techniques described herein may use one or more of ALUs embodied in a 3D pipeline. In at least one embodiment, weight parameters may be stored in on-chip or off-chip memory and/or registers (shown or not shown) that configure ALUs of graphics processor 2008 to perform one or more machine learning algorithms, neural network architectures, use cases, or training techniques described herein.

Embodiments presented herein can generate training communications using multiple types of content that can be used to train and fine tune threat detection models for various categories of recipients.

At least one embodiment of the disclosure can be described in view of the following clauses:

1. A method, comprising:
    receiving indication of a type of recipient for which a training communication is to be generated, the training communication to represent a spear phishing attempt for the type of recipient;
    generating, using a generative model, a body of text corresponding to the spear phishing attempt for the type of recipient;
    generating at least one additional type of content to be included in the training communication for the type of recipient;
    creating the training communication by at least combining the body of text and the at least one additional type of content in communication form;
    processing the training communication using at least one filtering criterion to determine that the training communication represents a valid spear phishing attempt with at least a minimum confidence value; and
    providing the training communication to be used to train a spear phishing detection model.

2. The method of clause 1, further comprising:
    creating a second training communication;
    processing the training communication using the at least one filtering criterion to determine that the second training communication does not represent a valid spear phishing attempt with at least a minimum confidence value; and
    providing information about the second training communication to at least the generative model to produce a third training communication that represents a valid spear phishing attempt with a higher confidence value than the second training communication.

3. The method of clause 1, wherein the at least one additional type of content corresponds to an image or a file attachment generated using at least one content generator separate from the generative model.

4. The method of clause 3, wherein training communication is created using metadata for the at least one additional type of content, wherein the training communication does not include a full version of the image or the file attachment.

5. The method of clause 1, wherein the at least one filtering criterion includes (1) detection of generation by an artificial intelligence (AI) generator or (2) detection as a phishing attempt.

6. The method of clause 1, further comprising:
    training the spear phishing detection model using a training dataset including the training communication;
    providing a received communication as input to the spear phishing model; and
    receiving, as output of the spear phishing model, a classification for the received communication.

7. The method of clause 6, wherein the classification includes a safe classification to be allowed, an unsafe classification to be blocked, or an indeterminable classification.

8. The method of clause 7, further comprising:
    providing information for the received communication to the recipient indicating the indeterminable classification and one or more reasons for the indeterminable classification.

9. The method of clause 8, further comprising:
receiving, in response to providing the information, feedback regarding whether the recipient considers the received communication to represent a spear phishing attempt; and
providing the feedback to further train at least the generative model to generate one or more additional bodies of text corresponding to one or more spear phishing attempts for the type of recipient.

10. A processor, comprising one or more circuits to:
receive indication of a type of recipient for which a training communication is to be generated, the training communication representing a spear phishing attempt;
cause a body of text to be generated, using a generative model, corresponding to the spear phishing attempt for the type of recipient;
cause at least one additional type of content to be generated that is to be included in the training communication for the type of recipient;
create the training communication using the body of text and the at least one additional type of content;
process the training communication using at least one filtering criterion to determine that the training communication represents a valid spear phishing attempt with at least a minimum confidence value; and
provide the training communication to be used to train a spear phishing detection model.

11. The processor of clause 10, wherein the one or more circuits are further to:
create a second training communication;
process the training communication using the at least one filtering criterion to determine that the second training communication does not represent a valid spear phishing attempt with at least a minimum confidence value; and
provide information about the second training communication to at least the generative model to produce a third training communication that represents a valid spear phishing attempt with a higher confidence value than the second training communication.

12. The processor of clause 10, wherein the at least one additional type of content corresponds to an image or a file attachment generated using at least one content generator separate from the generative model.

13. The processor of clause 12, wherein training communication is created using metadata for the at least one additional type of content, wherein the training communication does not include a full version of the image or the file attachment.

14. The processor of clause 10, wherein the at least one filtering criterion includes (1) detection of generation by an artificial intelligence (AI) generator or (2) detection as a phishing attempt.

15. The processor of clause 10, wherein the one or more circuits are further to:
train the spear phishing detection model using a training dataset including the training communication;
provide a received communication as input to the spear phishing model; and
receive, as output of the spear phishing model, a classification for the received communication.

16. A system, comprising:
one or more processors to generate a training communication for training a targeted cyber threat detection model by, at least in part, combining a body of text generated for a type of recipient, using a generative model, and at least one additional type of content generated for the type of recipient, the training communication to be used to train the targeted cyber threat detection model after processing with at least one filtering criterion to determine that the training communication represents a valid cyber-attack attempt with at least a minimum probability.

17. The system of clause 16, wherein the type of recipient corresponds to a role, position, tile, responsibility, or specific individual.

18. The system of clause 16, wherein the one or more processors are further to:
create a second training communication;
process the training communication using the at least one filtering criterion to determine that the second training communication does not represent a valid spear phishing attempt with at least a minimum confidence value; and
provide information about the second training communication to at least the generative model to produce a third training communication that represents a valid spear phishing attempt with a higher confidence value than the second training communication.

19. The system of clause 16, wherein the one or more processors are further to:
train the spear phishing detection model using a training dataset including the training communication;
provide a received communication as input to the spear phishing model; and
receive, as output of the spear phishing model, a classification for the received communication.

20. The system of clause 16, wherein the system is comprised at least one of:
a system for performing simulation operations;
a system for performing simulation operations to test or validate autonomous machine applications;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 10, computer programs in form of machine-readable executable code or computer control logic algorithms are stored in main memory 1004 and/or secondary storage. Computer programs, if executed by one or more processors, enable system 1000 to perform various functions in accordance with at least one embodiment. In at least one embodiment, memory 1004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1002, parallel processing system 1012, an integrated circuit capable of at least a portion of capabilities of both CPU 1002, parallel processing system 1012, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1012 includes, without limitation, a plurality of parallel processing units ("PPUs") 1014 and associated memories 1016. In at least one embodiment, PPUs 1014 are connected to a host processor or other peripheral devices via an interconnect 1018 and a switch 1020 or multiplexer. In at least one embodiment, parallel processing system 1012 distributes computational tasks across PPUs 1014 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1014, although such shared memory may incur performance penalties relative to use of local memory and registers resident to a PPU 1014. In at least one embodiment, operation of PPUs 1014 is synchronized through use of a command such as_syncthreads( ), wherein all threads in a block (e.g., executed across multiple PPUs 1014) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, one VPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processors @22@00, graphics cores 1500, parallel processor 1700, processor @17@00, processor core @17@00, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   receiving indication of a type of recipient for which a training communication is to be generated, the training communication to represent a spear phishing attempt for the type of recipient;
   generating, using a first generative model, a body of text corresponding to the spear phishing attempt for the type of recipient;
   generating, using a second generative model, at least one additional type of content comprising an image or file attachment to be included in the training communication for the type of recipient, wherein the training communication includes less than a full version of the image or file attachment;
   creating the training communication by at least combining the body of text and metadata from the at least one additional type of content in communication form;
   processing the training communication using at least one filtering criterion to determine that the training communication represents a valid spear phishing attempt with at least a minimum probability; and
   providing the training communication to be used to train a spear phishing detection model.

2. The method of claim 1, further comprising:
   creating a second training communication;
   processing the training communication using the at least one filtering criterion to determine that the second training communication does not represent a valid spear phishing attempt with at least a minimum probability; and
   providing information about the second training communication to at least the first generative model to produce a third training communication that represents a valid spear phishing attempt with a higher probability than the second training communication.

3. The method of claim 1, wherein the at least one filtering criterion includes (1) detection of generation by an artificial intelligence (AI) generator or (2) detection as a phishing attempt.

4. The method of claim 1, further comprising:
   training the spear phishing detection model using a training dataset including the training communication;
   providing a received communication as input to the spear phishing model; and
   receiving, as output of the spear phishing model, a classification for the received communication.

5. The method of claim 4, wherein the classification includes a safe classification to be allowed, an unsafe classification to be blocked, or an indeterminable classification.

6. The method of claim 5, further comprising:
   providing information for the received communication to the recipient indicating the indeterminable classification and one or more reasons for the indeterminable classification.

7. The method of claim 6, further comprising:
   receiving, in response to providing the information, feedback regarding whether the recipient considers the received communication to represent a spear phishing attempt; and
   providing the feedback to further train at least the first generative model to generate one or more additional bodies of text corresponding to one or more spear phishing attempts for the type of recipient.

8. A processor, comprising one or more circuits to:
   receive indication of a type of recipient for which a training communication is to be generated, the training communication representing a spear phishing attempt;
   cause a body of text to be generated, using a first generative model, corresponding to the spear phishing attempt for the type of recipient;
   cause at least one additional type of content comprising an image or file attachment to be generated, using a second generative model, that is to be included in the training communication for the type of recipient, wherein the training communication includes less than a full version of the image or file attachment;
   create the training communication using the body of text and metadata from the at least one additional type of content;
   process the training communication using at least one filtering criterion to determine that the training communication represents a valid spear phishing attempt with at least a minimum probability; and
   provide the training communication to be used to train a spear phishing detection model.

9. The processor of claim 8, wherein the one or more circuits are further to:
   create a second training communication;
   process the training communication using the at least one filtering criterion to determine that the second training communication does not represent a valid spear phishing attempt with at least a minimum probability; and
   provide information about the second training communication to at least the first generative model to produce a third training communication that represents a valid spear phishing attempt with a higher probability than the second training communication.

10. The processor of claim 8, wherein the at least one filtering criterion includes (1) detection of generation by an artificial intelligence (AI) generator or (2) detection as a phishing attempt.

11. The processor of claim 8, wherein the one or more circuits are further to:
   train the spear phishing detection model using a training dataset including the training communication;
   provide a received communication as input to the spear phishing model; and
   receive, as output of the spear phishing model, a classification for the received communication.

12. A system, comprising:
   one or more processors to generate a training communication for training a targeted cyber threat detection model by, at least in part, combining a body of text generated for a type of recipient, using a first generative model, and at least one additional type of content comprising an image or file attachment generated for the type of recipient, using a second generative model, the training communication include less than a full version of the image or file attachment, the training communication further to be used to train the targeted cyber threat detection model after processing with at least one filtering criterion to determine that the training communication represents a valid cyber-attack attempt with at least a minimum probability.

13. The system of claim 12, wherein the type of recipient corresponds to a role, position, tile, responsibility, or specific individual.

14. The system of claim 12, wherein the one or more processors are further to:
   create a second training communication;
   process the training communication using the at least one filtering criterion to determine that the second training communication does not represent a valid spear phishing attempt with at least a minimum probability; and
   provide information about the second training communication to at least the first generative model to produce a third training communication that represents a valid spear phishing attempt with a higher probability than the second training communication.

15. The system of claim 12, wherein the one or more processors are further to:
   train the targeted cyber threat detection model using a training dataset including the training communication;
   provide a received communication as input to the targeted cyber threat detection model; and
   receive, as output of the targeted cyber threat detection model, a classification for the received communication.

16. The system of claim 15, wherein the classification includes a safe classification to be allowed, an unsafe classification to be blocked, or an indeterminable classification.

17. The system of claim 16, wherein the one or more processors are further to provide information for the received communication to the recipient indicating the indeterminable classification and one or more reasons for the indeterminable classification.

18. The system of claim 17, wherein the one or more processors are further to:
   receive, in response to providing the information, feedback regarding whether the recipient considers the received communication to represent a spear phishing attempt; and
   provide the feedback to further train at least the first generative model to generate one or more additional bodies of text corresponding to one or more spear phishing attempts for the type of recipient.

19. The system of claim 12, wherein the system is further configured to:
   perform simulation operations;
   perform simulation operations to test or validate autonomous machine applications;
   render graphical output;
   perform deep learning operations;
   implement one or more actions using an edge device;
   generate or present virtual reality (VR) content;
   generate or present augmented reality (AR) content;
   generate or present mixed reality (MR) content;
   incorporate one or more Virtual Machines (VMs);
   implement one or more actions at least partially in a data center;
   perform hardware testing using simulation;
   generate synthetic data;
   generate collaborative content for 3D assets; or
   implement one or more actions at least partially using cloud computing resources.

20. The system of claim 12, wherein the at least one filtering criterion includes (1) detection of generation by an artificial intelligence (AI) generator or (2) detection as a phishing attempt.

* * * * *